United States Patent
Fujii et al.

(10) Patent No.: US 8,521,174 B2
(45) Date of Patent: Aug. 27, 2013

(54) RADIO COMMUNICATION METHOD AND RADIO BASE STATION

(75) Inventors: Hiromasa Fujii, Tokyo (JP); Hiroto Yasuda, Tokyo (JP); Hiroki Harada, Tokyo (JP); Shunji Miura, Tokyo (JP); Tomoyuki Ohya, Tokyo (JP)

(73) Assignee: NTT DOCOMO, Inc., Tokyo (JP)

( * ) Notice: Subject to any disclaimer, the term of this patent is extended or adjusted under 35 U.S.C. 154(b) by 0 days.

(21) Appl. No.: 13/332,909

(22) Filed: Dec. 21, 2011

(65) Prior Publication Data

US 2012/0178467 A1 Jul. 12, 2012

(30) Foreign Application Priority Data

Jan. 7, 2011 (JP) .................................. 2011-001653
Oct. 26, 2011 (JP) .................................. 2011-235230

(51) Int. Cl.
*H04W 88/02* (2009.01)

(52) U.S. Cl.
USPC ........................................................ 455/450

(58) Field of Classification Search
USPC .................................................. 455/450–453
See application file for complete search history.

(56) References Cited

U.S. PATENT DOCUMENTS

2011/0090854 A1* 4/2011 Montojo et al. .............. 370/329
2011/0268085 A1* 11/2011 Barany et al. ................. 370/331
2012/0208547 A1* 8/2012 Geirhofer et al. .......... 455/452.2

OTHER PUBLICATIONS

"$3^{rd}$ Generation Partnership Project; Technical Specification Group Radio Access Networks; 3G Home NodeB Study Item Technical Report (Release 8)", 3GPP TR 25.820 V8.2.0 (Technical report), (http://www.3gpp.org), Sep. 2008, 40 pages.
Yi Wu, et al., A Novel Spectrum Arrangement Scheme for Remto Cell Deployment in LTE Macro Cells, 2009 IEEE, pp. 6-11.
David Lopez-Perez, et al., OFDMA Femtocells: A Roadmap on Interference Avoidance, Sep. 2009, IEEE Communications Magazine, pp. 41-48.
Zubin Bharucha, et al., "Femto-Cell Resource Partitioning", 2009 IEEE, 6 pages.

* cited by examiner

*Primary Examiner* — Diane Mizrahi
(74) *Attorney, Agent, or Firm* — Oblon, Spivak, McClelland, Maier & Neustadt, L.L.P.

(57) ABSTRACT

When a frequency band is shared between a large cell system having a large cell base station and a small cell system having a small cell base station, the large cell base station dynamically controls dedicated resources for the large cell base station and shared resources for both the large cell base station and the small cell base station based on predetermined information, broadcasts allocation information of dedicated resources for the large cell base station and shared resources for both the large cell base station and the small cell base station, to the small cell base station belonging to the own cell, and the small cell base station belongs to at least one large cell base station and determines resource assignment in the own cell based on the resource allocation information broadcast from the large cell base station.

18 Claims, 16 Drawing Sheets

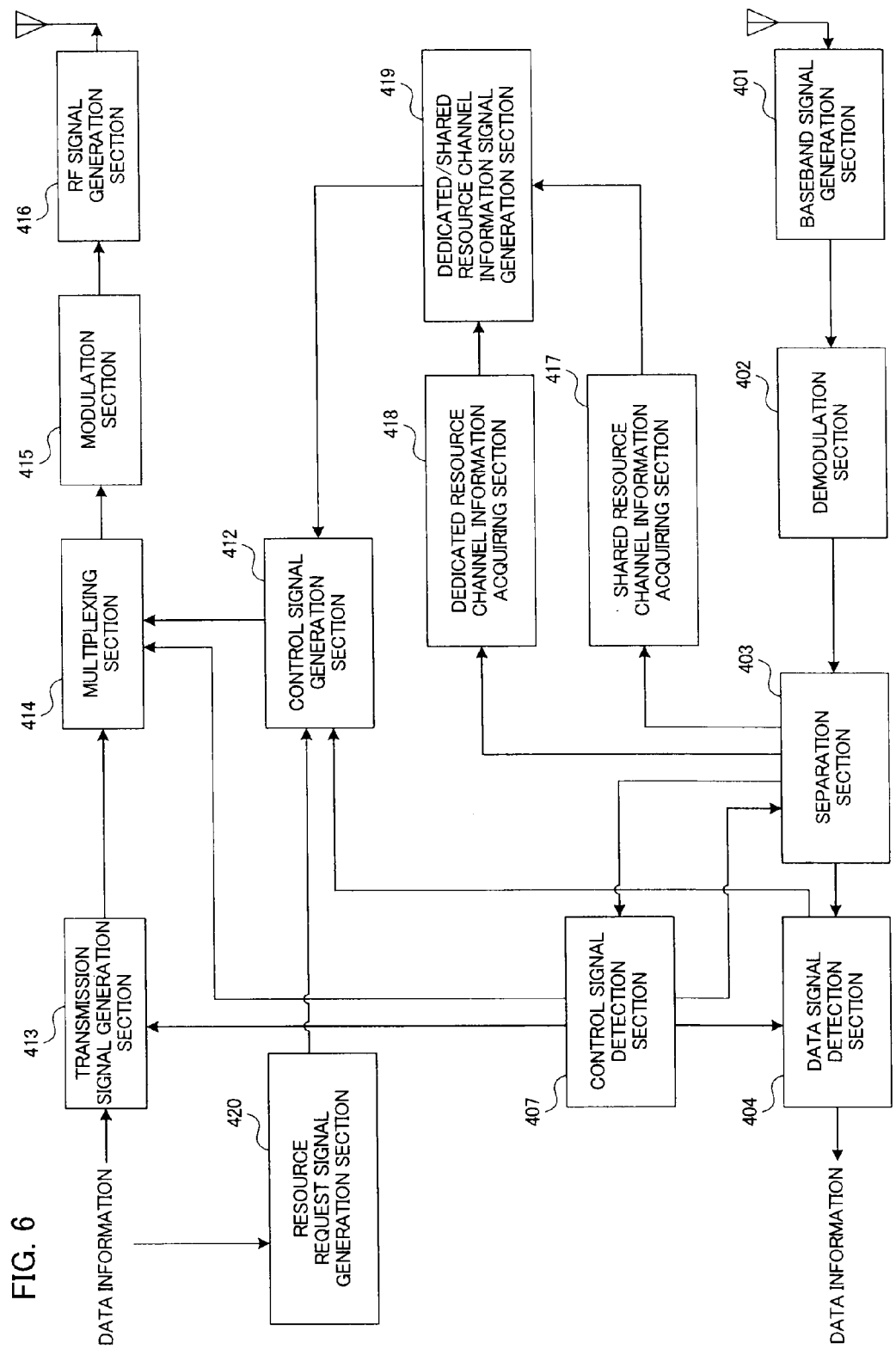

RADIO COMMUNICATION METHOD AND RADIO BASE STATION

CROSS-REFERENCE TO RELATED APPLICATIONS

This application is based upon and claims the benefit of priority from the prior Japanese Patent Application No. 2011-001653 filed on Jan. 7, 2011 and the prior Japanese Patent Application No. 2011-235230 filed on Oct. 26, 2011; the entire contents of which are incorporated herein by reference.

BACKGROUND OF THE INVENTION

1. Field of the Invention

The present invention relates to a radio communication method and a radio base station that shares a frequency band between radio communication systems whose communication areas spatially partially overlap with each other.

2. Description of the Related Art

In recent years, services of radio communication systems according to a variety of communication schemes are being provided. For example, 3GPP (Third Generation Partnership Project), the standardization organization, defines W-CDMA (Wideband Code Division Multiple Access), HSPA (High Speed Packet Access), LTE (Long Term Evolution) or the like. Furthermore, the IEEE (Institute of Electrical and Electronic Engineers) 802 committee defines wireless LAN (Wi-Fi (registered trademark): Wireless Fidelity) and radio MAN (WiMAX: Worldwide Interoperability for Microwave Access) or the like. Moreover, an XGP (eXtended Global Platform) service, which is the next-generation PHS scheme, has also started.

These communication schemes have different features regarding a frequency band, peak data rate, transmission distance or the like, and a radio communication apparatus is proposed which can communicate with radio communication systems using a plurality of different communication schemes. Furthermore, by causing some communication areas of the plurality of different radio communication systems to overlap with each other and by the radio communication apparatus selecting and connecting a specific radio communication system in the overlapping communication area, it is possible to receive a desired radio communication service.

For example, a large cell (e.g., macro cell) base station and a small cell (e.g., micro cell and/or femto) base station forming cells of different sizes, at least part of which overlaps with each other, may be provided (see FIG. 1). When the same operator operates the large cell base station and the small cell base station, two methods are available; a method of operating the large cell base station and the small cell base station at the same frequency and a method of operating those base stations at different frequencies.

When operating the large cell base station and the small cell base station at the same frequency, interference between the large cell base station and the small cell base station becomes a serious problem. For example, it is assumed that only some users access the small cell base station. In this case, there is a high possibility that a mobile terminal apparatus (UE#A) carrying out communication under the control of the large cell base station may receive strong interference through downlink and/or uplink communication near the small cell base station (see FIG. 2A). Furthermore, there is also a possibility that the small cell base station may receive interference from the mobile terminal apparatus (UE#A) (see FIG. 2D).

In an area adjacent to the large cell base station, a mobile terminal apparatus (UE#B) carrying out communication under the control of the small cell base station may receive strong interference from the large cell base station (see FIG. 2B). Furthermore, the large cell base station may also receive interference from the mobile terminal apparatus (UE#B) (see FIG. 2C).

On the other hand, when the radio communication system including the large cell base station and the radio communication system including the small cell base station are operated at different frequencies, it is necessary to provide a frequency band specific to the small cell base station. In this case, an area which becomes a so-called "white space" extends in an area where fewer small cell base stations are installed (area with a low geographic installation density). This may cause a problem that frequencies cannot be used effectively.

To solve the above-described problem, a method is proposed which controls resource allocation to the large cell base station and the small cell base station when sharing a frequency band between radio communication systems whose communication areas partially overlap with each other (e.g., 3GPP TR25.820 (hereinafter referred to as "Non-Patent Document 1"), Y. Wu et al., "A Novel Spectrum Arrangement Scheme for Femto Cell Deployment in LTE Macro Cells" 2009 IEEE 20th International Symposium on Personal, Indoor and Mobile Radio Communications (hereinafter referred to as "Non-Patent Document 2"), D. Lopez-Perez et al., "OFDMA Femtocells: A roadmap on Interference Avoidance" IEEE Communications Magazine, Volume: 47, Issue: 9 (hereinafter referred to as "Non-Patent Document 3), Z. Bharucha et. al, "Femto-Cell Resource Partitioning" 2009 IEEE GLOBECOM Workshops (hereinafter referred to as "Non-Patent Document 4")).

However, the method described in Non-Patent Document 1 has a configuration using some resources as shared bands for a macro cell base station and femto cell base station and constantly using some resources for only the macro cell. The method causes a problem that the frequency utilization efficiency deteriorates depending on the radio communication environment.

On the other hand, the method in Non-Patent Document 2 determines based on a received signal whether or not a macro cell terminal is located near a femtocell base station and reports the determination result to a macro cell base station so as to allocate dedicated resources to the macro cell terminal located near the femtocell base station and allocate shared or dedicated resources to other terminals. This makes it possible to avoid interference from the macro terminal to the femtocell base station in uplink communication. However, there is no disclosure regarding avoidance of interference from the femtocell base station or femtocell terminal to communication of the macro cell base station, or dynamic resource allocation to the femtocell base station and macro cell base station.

Furthermore, Non-Patent Document 4 discloses a method whereby a macro cell terminal identifies a femtocell base station which becomes an interference source, reports it to a macro base station and when the macro base station allocates resources to the macro cell terminal, the macro base station prohibits the femtocell base station which becomes the interference source from using resources allocated to the macro cell terminal. However, since the macro cell terminal needs to identify the femtocell base station which becomes the interference source, one problem is that the amount of processing in the macro cell terminal drastically increases and another problem is that when a considerably large number of femtocell base stations exist in the cell of the macro cell base station, the interference source can no longer be identified. A further problem is that the processing load on the network side increases and the amount of radio resources for individual reporting to the femtocell base station increases.

SUMMARY OF THE INVENTION

The present invention has been implemented in view of the above-described problems and it is an object of the present invention to provide a radio communication method and a radio base station that can reduce interference and improve frequency utilization efficiency when sharing a frequency band between radio communication systems whose communication areas at least partially overlap with each other.

A radio communication method according to the present invention is a radio communication method for sharing a frequency band between a large cell system including a large cell base station having a relatively large cell size and a small cell system including a small cell base station having a relatively small cell size. In the radio communication method, the large cell base station allocates a dedicated resource for the large cell base station and a shared resource for both the large cell base station and the small cell base station dynamically based on information reported from a mobile terminal apparatus carrying out communication in a cell of the large cell base station and information reported from the small cell base station belonging to the large cell base station; and broadcasts information on the dedicated resource for the large cell base station and the shared resource to the small cell base station belonging to the large cell base station. The small cell base station belongs to at least one large cell base station and determines an assignment resource in a cell of the small cell base station based on the information broadcast from the large cell base station to which the small cell base station belongs on the dedicated resource for the large cell base station and the shared resource.

A radio base station according to the present invention is A radio base station that holds a small cell base station having a cell size relatively smaller than an own cell under the control thereof and dynamically controls a dedicated resource for the own cell and a shared resource with the small cell base station, including a resource channel information acquiring section configured to detect resource channel information from a mobile terminal apparatus carrying out communication under the control of the own cell; a resource usage situation monitoring section configured to detect a resource usage situation of the own cell; a resource addition request information signal detection section configured to detect resource addition request information reported from the small cell base station; a dedicated/shared resource determining section configured to dynamically allocate a dedicated resource for the own cell and a shared resource for both the own cell and the small cell base station based on the resource channel information, resource addition request information and the resource usage situation; and a transmitting section configured to broadcast resource allocation information determined by the dedicated/shared resource determining section to the small cell base station.

Another radio base station according to the present invention is a radio base station belonging to a large cell base station having a cell size relatively larger than the own cell, including a belonging base station determining section configured to determine the large cell base station to which the own cell belongs; a resource channel information acquiring section configured to detect resource channel information from a mobile terminal apparatus carrying out communication under the control of the own cell; a resource addition request signal generation section configured to generate resource addition request information to be reported to the large cell base station based on a resource usage situation of the own cell and a traffic situation; a dedicated/shared resource information detection section configured to detect information reported from the large cell base station on a dedicated resource for the large cell base station and a shared resource for both the own cell and the large cell base station; and a resource allocation control section configured to determine a resource to be assigned to each mobile terminal apparatus carrying out communication under the control of the own cell based on the information detected by the dedicated/shared resource information detection section.

BRIEF DESCRIPTION OF THE DRAWINGS

FIG. 6 is a function block diagram of a mobile terminal apparatus under the control of the large cell base station or small cell base station in the frequency sharing radio communication system according to the embodiment of the present invention;

DETAILED DESCRIPTION OF THE INVENTION

Hereinafter, embodiments of the present invention will be described in detail with reference to the accompanying drawings.

Embodiment 1

Figure 1:
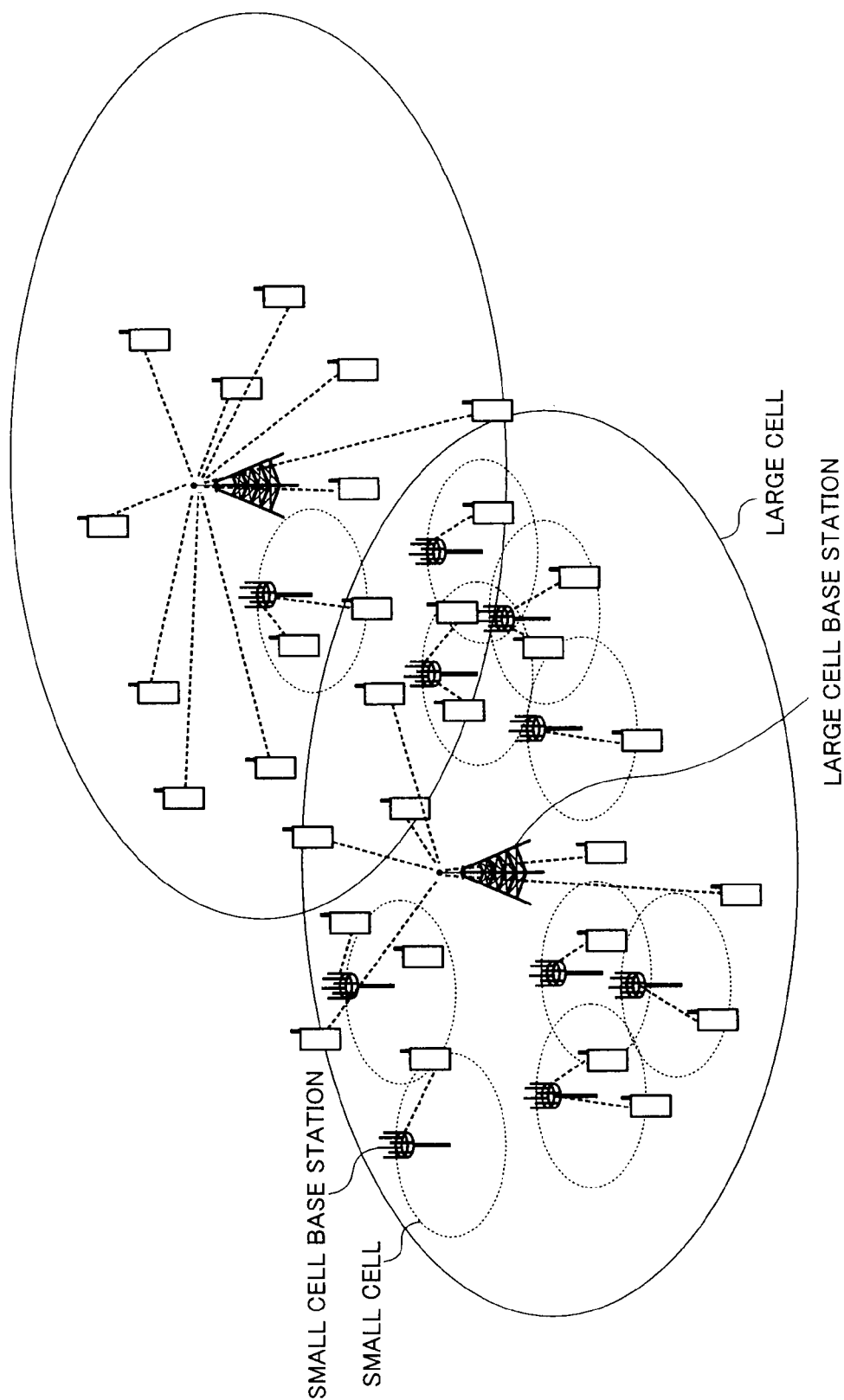
FIG. 1 is a diagram illustrating radio communication systems whose communication areas spatially partially overlap with each other.
Figure 2A:
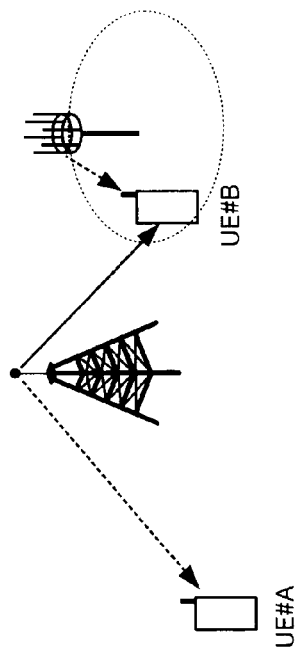
FIG. 2 is a diagram illustrating interference between radio communication systems whose communication areas spatially partially overlap with each other.
Figure 2C:
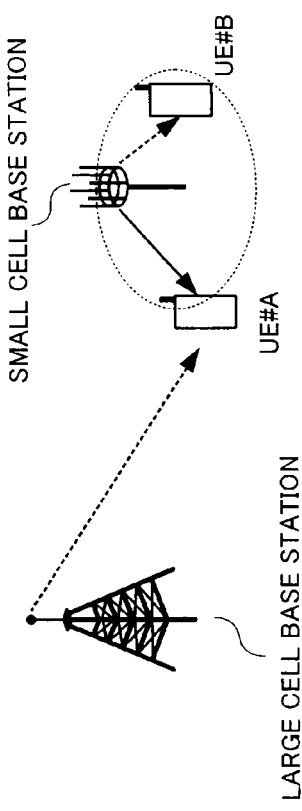
Figure 2B:
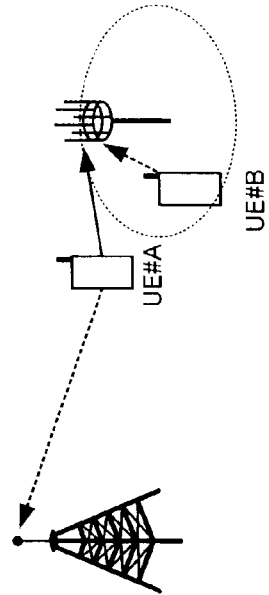
Figure 2D:
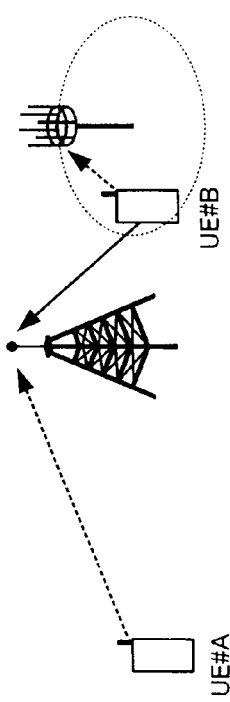
Figure 3:
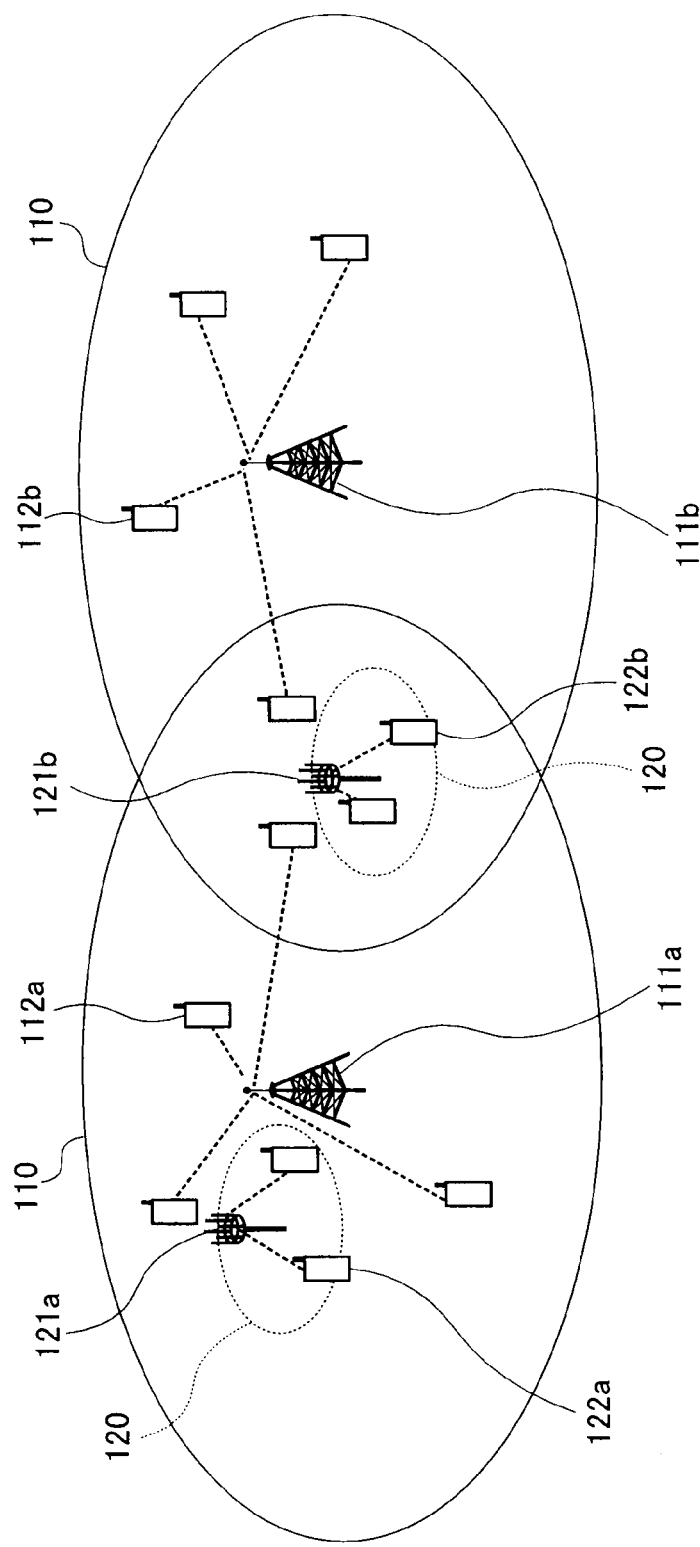
FIG. 3 is a diagram illustrating a configuration of a frequency sharing radio communication system according to an embodiment of the present invention.

An overview of a configuration of a frequency sharing radio communication system that shares a frequency band between different radio communication systems will be described with reference to FIG. 3. The system configuration shown in FIG. 3 is merely an illustrative description and the present invention is not limited to this configuration. The present invention is applicable to any configuration sharing a frequency band between different radio communication systems. Examples of a plurality of radio communication systems include a 3G radio (W-CDMA) access system, LTE access system, WLAN access system, WiMAX access system, but the radio communication systems are not limited to these systems.

FIG. 3 shows a case where large cell radio systems 110 including large cell base stations 111a and 111b having a relatively large cell size and small cell radio systems 120 including small cell base stations 121a and 121b having a relatively small cell size are provided and communication areas of the respective systems overlap with each other.

Furthermore, mobile terminal apparatuses 112a and 112b carrying out communication under the control of the large cell base stations 111a and 111b respectively are located in the communication areas of the large cell base stations 111a and 111b respectively. Mobile terminal apparatuses 122a and 122b carrying out communication under the control of the small cell base stations 121a and 121b respectively are located in the communication areas of the small cell base stations 121a and 121b respectively. Furthermore, the mobile terminal apparatus 122a is also located in the communication area of the large cell base station 111a and the mobile terminal apparatus 122b is also located in the communication areas of the large cell base stations 111a and 111b.

The large cell base stations 111a and 111b have a larger cell size than the small cell base stations 121a and 121b, and, for example, the large cell corresponds to a macro cell and the small cell corresponds to a micro cell or femtocell. As an example, the large cell radio system 110 may be a cellular system and the small cell radio system 120 may be a WLAN access system. The communication scheme of the large cell radio system 110 and the communication scheme of the small cell radio system 120 are not particularly limited. Furthermore, the numbers of large cell base stations and small cell base stations are not limited to those shown in FIG. 3.

Radio communication in which a frequency band is shared between the large cell radio system 110 and small cell radio system 120 will be described by taking the large cell base station 111a and the small cell base station 121a as an example.

The large cell base station 111a dynamically controls allocation of dedicated resources for the large cell base station 111a and shared resources for both the large cell base station 111a and the small cell base station 121a. For example, the large cell base station 111a dynamically controls dedicated resources for the large cell base station 111a and shared resources for both the large cell base station 111a and the small cell base station 121a based on resource channel information of the mobile terminal apparatus 112a carrying out communication under the control of the own cell, information on a resource usage situation of the own cell and resource addition request information reported from the small cell base station 121a belonging to the large cell base station 111a or the like.

The large cell base station 111a broadcasts the information (resource allocation information) on the determined dedicated resources for the large cell base station 111a (hereinafter referred to as "dedicated resources for the large cell base station") and shared resources for both the large cell base station 111a and the small cell base station 121a (hereinafter referred to as "shared resource") to the small cell base station 121a.

The small cell base station 121a belongs to at least one large cell base station (here, large cell base station 111a) and receives resource allocation information broadcast from the large cell base station 111a to which it belongs. The small cell base station 121a dynamically controls the dedicated resources for the large cell base station and the shared resources in the own cell based on the received resource allocation information. The small cell base station 121a then assigns resources (shared resources) other than the dedicated resources for the large cell base station to the mobile terminal apparatus 122a carrying out communication under the control of the small cell base station 121a.

Thus, the large cell base station controls dedicated resources for the large cell base station and shared resources shared with the small cell base station under the control of the large cell base station according to a communication situation and dynamically controls resource allocation based on an instruction of the large cell base station to which the small cell base station belongs, and can thereby avoid interference between the large cell base station and the small cell base station and realize high frequency utilization efficiency according to the communication environment. Furthermore, the large cell base station dynamically allocates dedicated resources for and shared resources based on the reception situation in the large cell base station and the communication situation in the small cell base station or the like, and can thereby reduce loads on the network side. Furthermore, the large cell base station broadcasts resource allocation information to the small cell base station using the dedicated resources for the large cell base station, and can thereby transmit a signal from the large cell base station to the small cell base station more reliably without establishing another channel between the large cell base station and the small cell base station.

Next, a specific example of the radio communication method when a frequency band is shared between the above-described large cell base station and small cell base station will be described with reference to FIG. 12.

First, the small cell base station 121a determines the large cell base station (here, large cell base station 111a) to which it belongs (step 11). The small cell base station 121a reports that it belongs to the large cell base station 111a to the large cell base station 111a.

The small cell base station 121a can determine the large cell base station to which it belongs based on the signal received from the large cell base station and can belong to one or a plurality of large cell base stations. When the small cell base station 121a selectively belongs to one large cell base station, the small cell base station 121*a* decides to belong to a large cell base station whose received signal has the highest power.

Next, the mobile terminal apparatus reports resource channel information to the base station to which it belongs (step 12). For example, the mobile terminal apparatus 112*a* reports dedicated resource channel information of the large cell base station 111*a* and shared resource channel information of both the large cell base station 111*a* and the small cell base station 121*a* to the large cell base station 111*a* to which it belongs. On the other hand, the mobile terminal apparatus 112*b* reports at least shared resource channel information to the small cell base station 121*a* to which it belongs.

The dedicated resource channel information of the large cell base station 111*a* is information on channel quality (SINR or the like) of a dedicated resource channel and the shared resource channel information of both the large cell base station 111*a* and the small cell base station 121*a* is information on channel quality of a shared resource channel.

For example, as the dedicated resource channel information of the large cell base station 111*a*, the desired receiving power can be estimated by detecting a correlation between a known signal sequence transmitted by the large cell base station 111*a* and desired signal power. Furthermore, the interference signal and noise power can be acquired by detecting receiving power of resources not used in the cell via the dedicated resource channel. An SINR of the dedicated resource channel can be calculated based on the above information. Furthermore, regarding also the shared resource channel information of the large cell base station 111*a* and the small cell base station 121*a*, SINRs can be calculated likewise.

Next, the small cell base station 121*a* generates resource addition request information from a resource usage situation of the small cell base station 121*a* and a traffic situation of the small cell base station 121*a* and reports the resource addition request information to the large cell base station 111*a* to which it belongs (step 13).

The resource usage situation may be a resource usage rate of shared resources or a resource usage rate used in the own cell (small cell base station). Furthermore, the resource usage rate can be determined based on an average of resources used in a predetermined number of past frames.

For example, the small cell base station 121*a* requests a larger amount of resources when the amount of resources allocated to the small cell base station 121*a* is small (when the amount of resources allocated is equal to or below a predetermined amount of resources. Furthermore, when the usage rate of resources used in the large cell base station 111*a* is low, the small cell base station 121*a* may be configured to request a larger amount of resources. In addition, when the amount of traffic in the small cell base station 121*a* is large, the small cell base station 121*a* may be configured to request a larger amount of resources.

The resource addition request information reported by the small cell base station 121*a* may only be sent to at least the large cell base station 111*a* to which it belongs.

Next, the large cell base station 111*a* detects a resource usage situation based on a traffic situation of the uplink and downlink of the own cell (step 14).

Next, the large cell base station 111*a* determines the dedicated resources for the large cell base station and the shared resources based on the information obtained in step 11 to step 14 above (step 15). To be more specific, the dedicated resources for the large cell base station and the shared resources are determined based on resource channel information of the mobile terminal apparatus, resource addition request information reported from the small cell base station 121*a* and traffic information of the large cell base station 111*a* or the like.

Next, the resource allocation information determined by the large cell base station 111*a* in step 15 above is broadcast to the small cell base station 121*a* (step 16). In this case, the large cell base station 111*a* preferably broadcasts the resource allocation information to the small cell base station 121*a* by using the dedicated resources for the large cell base station. That is, as for the shared resources, the small cell base station 121*a* may allocate the resources to the mobile terminal apparatus, and in this case, another communication channel is required between the large cell base station 111*a* and the small cell base station 121*a*. For this reason, using the dedicated resources for the large cell base station allows the small cell base station 121*a* to receive signals from the large cell base station 111*a* more reliably than the case of using the shared resources.

Next, the small cell base station 121*a* determines resource assignment in the small cell base station 121*a* (dedicated resources for the large cell base station and shared resources) based on the resource allocation information broadcast from the large cell base station 111*a* (step 17).

Next, the large cell base station 111*a* and the small cell base station 121*a* determine resources to be assigned to the mobile terminal apparatus carrying out communication under the control of the own cell (step 18). The large cell base station 111*a* assigns resources from a region allocated for the dedicated resources for the large cell base station or the shared resources, to each mobile terminal apparatus 112*a* under the control of the large cell base station 111*a*. On the other hand, the small cell base station 121*a* assigns resources from a region allocated for radio resources (here, shared resources) other than dedicated resources for the large cell base station, to each mobile terminal apparatus 112*b* under the control of the small cell base station 121*a*. Each base station controls resource assignment to each mobile terminal apparatus based on a communication speed request or channel quality information or the like reported from each mobile terminal apparatus. This allows optimum assignment to be performed for each mobile terminal apparatus.

In above description, the dedicated resources for the large cell base station and the shared resources are allocated, but in addition to these, dedicated resources for the small cell base station may be allocated. This case will be described below.

Figure 8:
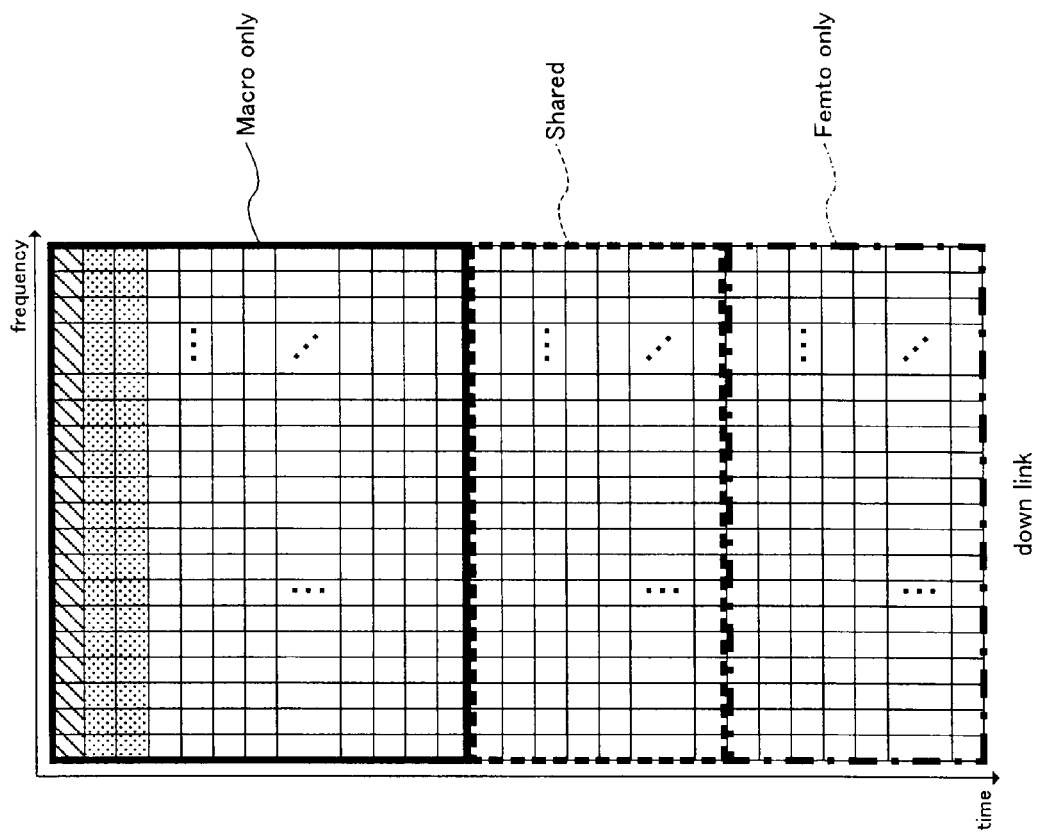
FIG. 8 is a diagram illustrating an example of allocation of dedicated resources for the large cell base station, dedicated resources for the small cell base station and shared resources according to the embodiment of the present invention.

When dedicated resources for the small cell base station are provided, the large cell base station dynamically controls dedicated resources for the small cell base station (Femto only) in addition to the dedicated resources for the large cell base station (Macro only) and the shared resources (Shared) (see FIG. 8). The resource allocation information determined by the large cell base station 111*a* (information on the dedicated resources for the large cell base station, the share resources and the dedicated resources for the small cell base station) is broadcast to the small cell base station. This also makes it possible to effectively reduce interference in a mobile terminal apparatus carrying out communication under the control of the small cell base station 121*a*.

Figure 12:
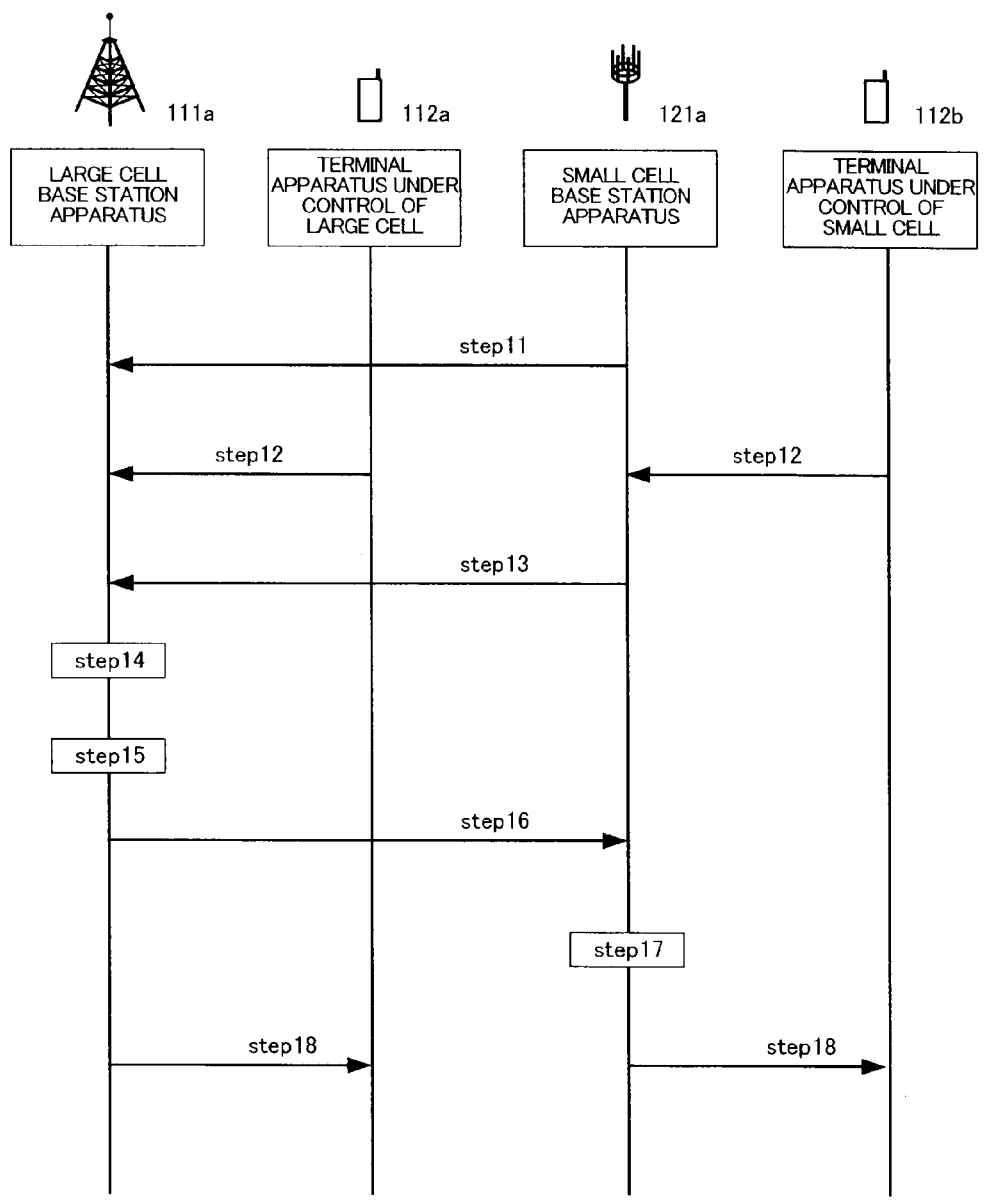
FIG. 12 is a diagram illustrating an example of a radio communication method according to the present embodiment.

When the dedicated resources for the small cell base station are provided, in step 12 of FIG. 12 above, the mobile terminal apparatus 122*a* reports dedicated resource channel information of the small cell base station 121*a* in addition to the shared resource channel information to the small cell base station 121*a* to which it belongs.

Furthermore, when the dedicated resources for the small cell base station are provided, it is preferable to allocate some specific resources to the small cell base station and to transmit a signal sequence specific to the base station for establishing synchronization and basic broadcast information (or information of the resources through which the broadcast information is transmitted) by using the allocated specific resources.

Hereinafter, an example of the configuration of the large cell base station, small cell base station and mobile terminal apparatus included in the frequency sharing radio communication system will be described more specifically with reference to the attached drawings.

<Large Cell Base Station>

Figure 4:
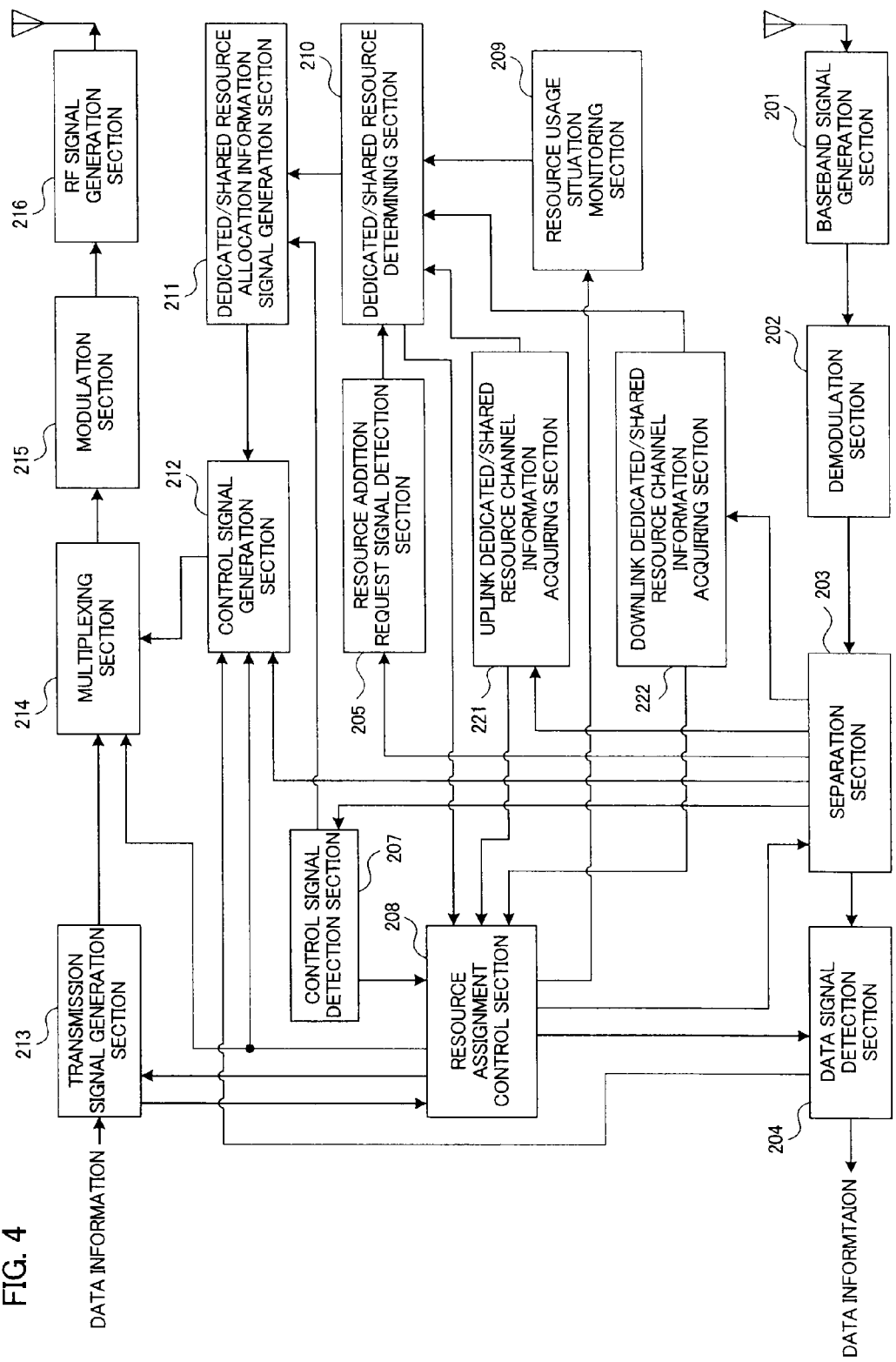
FIG. 4 is a function block diagram of a large cell base station in the frequency sharing radio communication system according to the embodiment of the present invention.

FIG. 4 shows one configuration example of the large cell base station.

A signal received by the large cell base station is demodulated by a demodulation section 202 via a baseband signal generation section 201 and then input to a separation section 203. The baseband signal generation section 201 converts the radio frequency signal received via an antenna to a baseband signal. The separation section 203 separates the signal outputted from the demodulation section 202 into various control signals and a data signal, outputs the data signal to a data signal detection section 204 and outputs the various control signals including a resource addition request signal or the like from the small cell base station to a resource addition request signal detection section 205, a control signal detection section 207, a control signal generation section 212, an uplink dedicated/shared resource channel information acquiring section 221 and a downlink link dedicated/shared resource channel information acquiring section 222.

The data signal detection section 204 performs bit detection, error correcting decoding or error detection on the baseband signal (I, Q signal) input from the separation section 203 and outputs the error detection result to the control signal generation section 212.

The uplink dedicated/shared resource channel information acquiring section 221 detects channel information of dedicated for the large cell base station on an uplink of each mobile terminal apparatus carrying out communication under the control of the cell of the large cell base station and channel information of shared resources for both the large cell base station and the small cell base station based on the signal input from the separation section 203. The detected information is outputted to a dedicated/shared resource determining section 210. The resource addition request signal detection section 205 detects the resource addition request information reported from the small cell base station belonging to the large cell base station and outputs the detected information to the dedicated/shared resource determining section 210.

The downlink link dedicated/shared resource channel information acquiring section 222 detects resource channel information dedicated to the large cell base station on a downlink of each mobile terminal apparatus carrying out communication under the control of the large cell base station and shared resource channel information for both the large cell base station and the small cell base station, based on the signal input from the separation section 203. The detected information is outputted to the dedicated/shared resource determining section 210 and a resource assignment control section 208.

The control signal detection section 207 detects a control signal from the signal input from the separation section 203 and outputs the control signal to the resource assignment control section 208 and a dedicated/shared resource allocation information signal generation section 211.

A resource usage situation monitoring section 209 monitors a traffic situation of the uplink and downlink of the own cell, detects the usage situation of resources of the own cell and outputs the usage situation to the dedicated/shared resource determining section 210. The dedicated/shared resource determining section 210 determines the dedicated resources for the large cell base station and the shared resources based on the resource addition request information reported from the small cell base station, resource usage situation of the large cell base station and resource channel information of the mobile terminal apparatus under the control of the large cell base station.

The dedicated/shared resource allocation information signal generation section 211 generates a signal on resource allocation based on information outputted from the dedicated/shared resource determining section 210 and outputs the signal to the control signal generation section 212. The signal related to the resource allocation generated in the dedicated/shared resource allocation information signal generation section 211 is broadcast to the small cell base station belonging to the large cell base station.

The resource assignment control section 208 determines resources to be assigned to a control signal or each mobile terminal apparatus based on the supplied information or the like.

The control signal generation section 212 generates a control signal based on the input information and outputs the control signal to a multiplexing section 214. A transmission signal generation section 213 applies error correcting coding and symbol mapping to data to be transmitted (bit sequence) and generates a transmission symbol. The multiplexing section 214 multiplexes the transmission symbol (user traffic) from the transmission signal generation section 213 and the control signal from the control signal generation section 212 based on the resource assignment information and outputs the multiplexed signal to a modulation section 215. The modulation section 215 modulates the transmission symbol input from the multiplexing section 214 and outputs the modulated transmission symbol to an RF signal generation section 216. The RF signal generation section 216 generates an RF signal and transmits the RF signal to the mobile terminal apparatus or the small cell base station under the control of the cell of the large cell base station via an antenna. The RF signal generation section 216 and the antenna configure a transmitting section.

<Small Cell Base Station>

Figure 5:
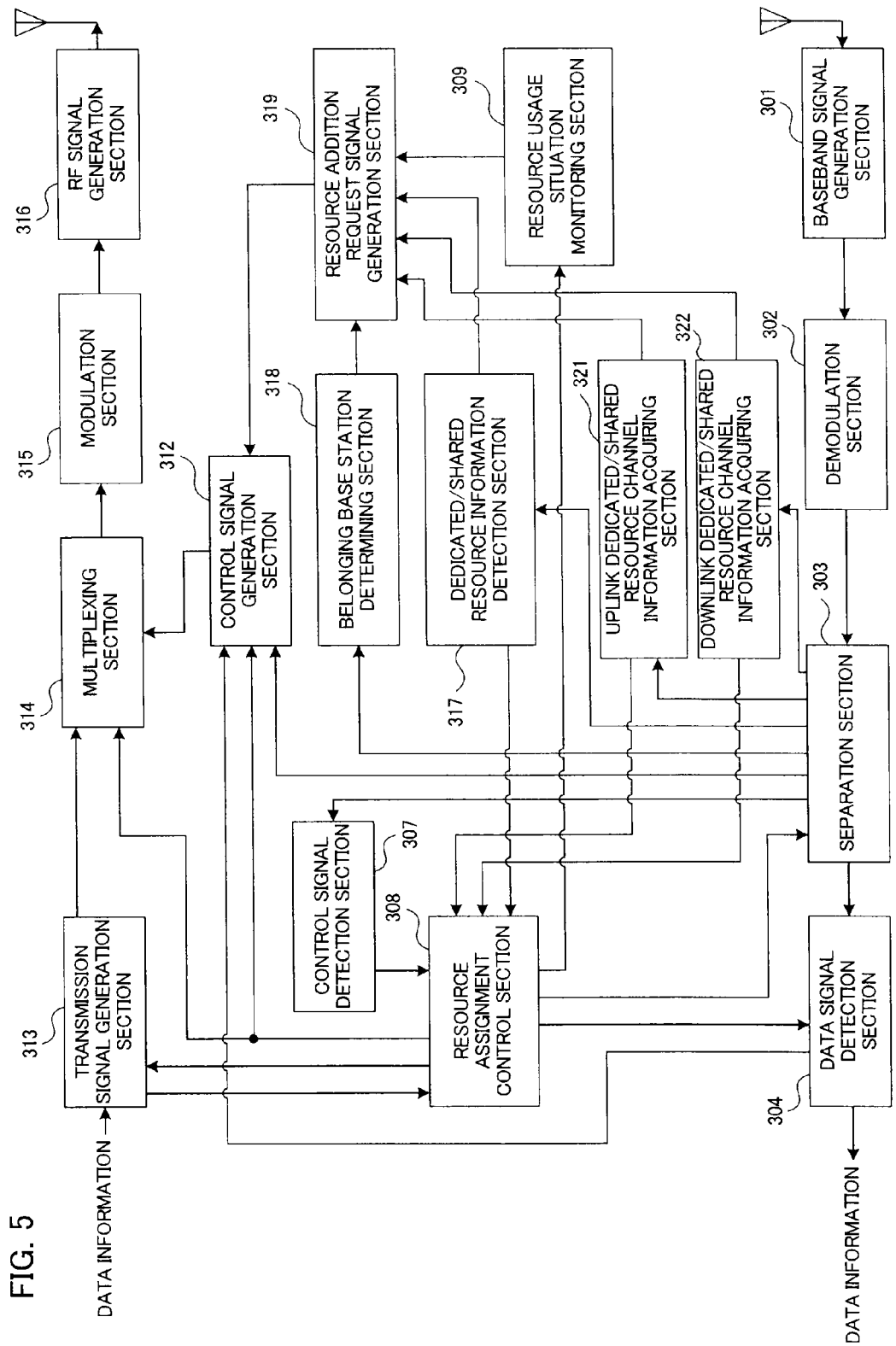
FIG. 5 is a function block diagram of a small cell base station in the frequency sharing radio communication system according to the embodiment of the present invention.

FIG. 5 shows one configuration example of the small cell base station.

A signal received by the small cell base station is demodulated by a demodulation section 302 via a baseband signal generation section 301, and then input to a separation section 303. The baseband signal generation section 301 converts the radio frequency signal received via an antenna to a baseband signal. The separation section 303 separates the signal outputted from the demodulation section 302 into various control signals and a data signal, outputs the data signal to a data signal detection section 304 and outputs the various control signals to a dedicated/shared resource information detection section 317, a belonging base station determining section 318, a control signal detection section 307, a control signal generation section 312, an uplink dedicated/shared resource channel information acquiring section 321 and a downlink dedicated/shared resource channel acquiring section 322.

The data signal detection section 304 performs bit detection, error correcting decoding and error detection on the baseband signal (I, Q signal) input from the separation section 303 and outputs the detection result to the control signal generation section 312.

The belonging base station determining section 318 determines a large cell base station to which the own cell belongs. To be more specific, the large cell base station to which the small cell base station belongs is determined based on a pilot signal transmitted from the large cell base station to the small cell base station. A plurality of large cell base stations may be selected or one large cell base station may be set as the belonging cell base station. When one large cell base station is set as the belonging cell base station, for example, a large cell base station having the highest receiving power is selected.

The dedicated/shared resource information detection section 317 detects allocation information of the dedicated resources for the large cell base station and the shared resources transmitted from the belonging large cell base station and outputs the detected allocation information to a resource assignment control section 308 and a resource addition request signal generation section 319.

The uplink dedicated/shared resource channel information acquiring section 321 detects, for an uplink of each mobile terminal apparatus carrying out communication under the control of the small cell base station, dedicated resource channel information for the small cell base station and shared resource channel information for both the large cell base station and the small cell base station, based on the signal input from the separation section 303. The detected information is outputted to the resource addition request signal generation section 319. The downlink dedicated/shared resource channel information acquiring section 322 detects, for a downlink of each mobile terminal apparatus carrying out communication under the control of the small cell base station, dedicated resource channel information for the downlink small cell base station and shared resource channel information for both the large cell base station and the small cell base station, based on the signal input from the separation section 303. The detected information is outputted to the resource addition request signal generation section 319 and the resource assignment control section 308. When the dedicated resources for the small cell base station are not provided, both the uplink dedicated/shared resource channel information acquiring section 321 and the downlink dedicated/shared resource channel information acquiring section 322 may be configured to acquire only the shared resource channel information.

The resource addition request signal generation section 319 determines the necessity for additional resources from the resource usage situation and traffic situation of the small cell base station and generates a resource addition request signal. The resource addition request signal is reported to the belonging large cell base station via a wireless link. This reporting may also be performed using a wired link.

A resource usage situation monitoring section 309 monitors a traffic situation of the uplink and downlink of the own cell, detects a resource usage situation of the own cell and outputs it to the resource addition request signal generation section 319.

The resource assignment control section 308 determines resources to be assigned to a control signal or each mobile terminal apparatus based on the input information or the like.

The control signal generation section 312 generates a control signal based on the input information and outputs it to a multiplexing section 314. A transmission signal generation section 313 applies error correcting coding and symbol mapping to data to be transmitted (bit sequence) and generates a transmission symbol. The multiplexing section 314 multiplexes the transmission symbol (user traffic) from the transmission signal generation section 313 and the control signal from the control signal generation section 312 based on the resource assignment information and outputs the multiplexed signal to a modulation section 315. The modulation section 315 modulates the transmission symbol input from the multiplexing section 314 and outputs the modulated symbol to an RF signal generation section 316. The RF signal generation section 316 generates an RF signal and then transmits it to the mobile terminal apparatus under the control of the cell of the large cell base station and the small cell base station via an antenna. The RF signal generation section 316 and the antenna configure a transmitting section.

<Mobile Terminal Apparatus>

FIG. 6 shows one configuration example of the mobile terminal apparatus.

In the mobile terminal apparatus, a received signal is demodulated by a demodulation section 402 via a baseband signal generation section 401 and then input to a separation section 403. The baseband signal generation section 401 converts a radio frequency signal received via an antenna to a baseband signal. The separation section 403 separates the signal outputted from the demodulation section 402 into various control signals and a data signal, outputs the data signal to a data signal detection section 404 and outputs the various control signals to shared resource channel information acquiring section 417, dedicated resource channel information acquiring section 418 and control signal detection section 407.

The data signal detection section 404 performs bit detection, error correcting decoding and error detection on the baseband signal (I, Q signal) input from the separation section 403 and outputs the detection result to a control signal generation section 412.

The shared resource channel information acquiring section 417 acquires channel information of shared resources and outputs the channel information to a dedicated/shared resource channel information signal generation section 419. The dedicated resource channel information acquiring section 418 acquires channel information of dedicated resources for the belonging base station and outputs the channel information to a dedicated/shared resource channel information signal generation section 419. The dedicated/shared resource channel information signal generation section 419 generates a dedicated/shared resource channel information signal based on the input information and outputs it to the control signal generation section 412.

A resource request signal generation section 420 generates a resource request signal and outputs it to the control signal generation section 412.

The control signal detection section 407 detects a control signal from the signal input from the separation section 403 and outputs the control signal to the separation section 403, a transmission signal generation section 413 and a multiplexing section 414.

The control signal generation section 412 generates a control signal based on the input information and outputs the control signal to the multiplexing section 414. The transmission signal generation section 413 applies error correcting coding and symbol mapping to data to be transmitted (bit sequence) and generates a transmission symbol. The multiplexing section 414 multiplexes a transmission symbol (user traffic) from the transmission signal generation section 413 with the control signal from the control signal generation section 412 based on the resource assignment information and outputs the multiplexed signal to a modulation section 415. The modulation section 415 modulates the transmission symbol input from the multiplexing section 414 and outputs the modulated transmission symbol to an RF signal generation section 416. The RF signal generation section 416 generates an RF signal and then transmits the RF signal to the mobile terminal apparatus under the control of the cell of the large cell base station and the small cell base station via an antenna. The RF signal generation section 416 and the antenna constitute a transmitting section.

The frequency sharing radio communication system shown in the present embodiment is applicable to a system using OFDMA, CDM or TDM. When OFDM is used, the above-described modulation section and demodulation section are configured as shown in FIGS. 7 (A) and (B) respectively.

Figure 7A:
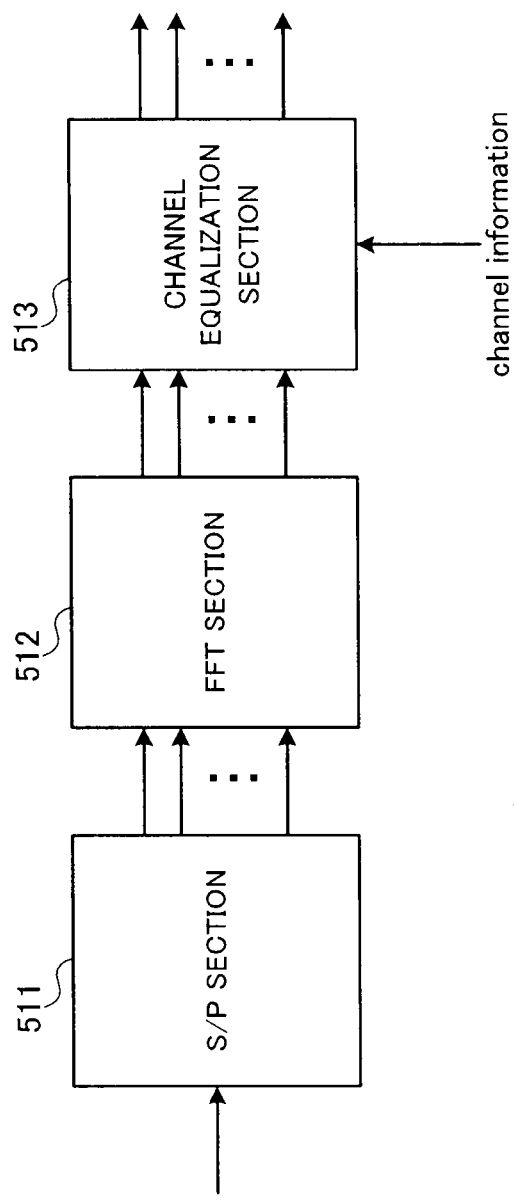
FIG. 7 is a diagram illustrating configurations of the modulation section and the demodulation section when using OFDMA according to the embodiment of the present invention.
Figure 7B:
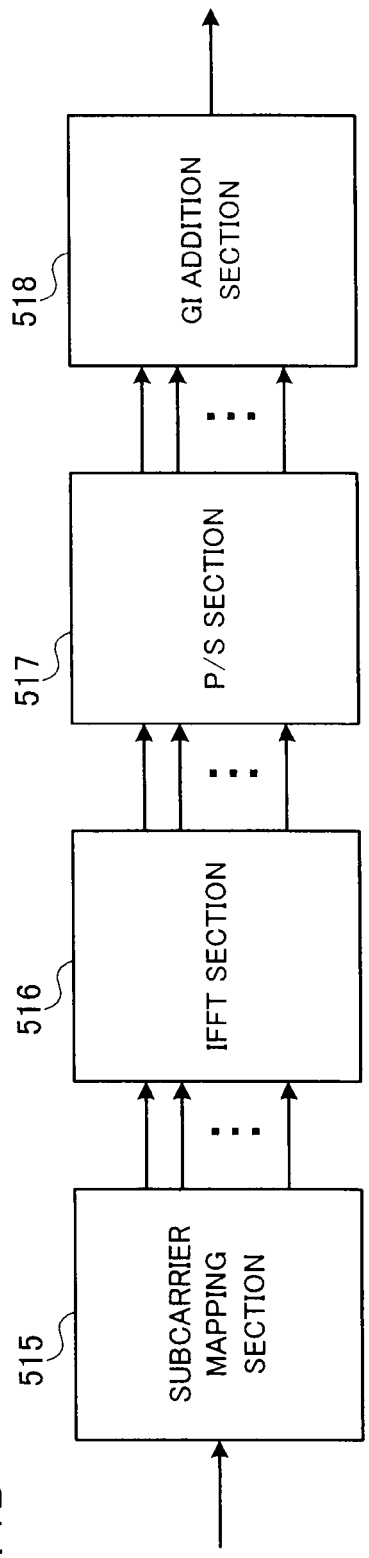

In FIG. 7 (A), a received signal input from the baseband signal generation section is converted to parallel data by a serial/parallel converter (S/P section 511) to then perform FFT processing in an FFT section 512. For the signal after the FFT processing, correction (channel equalization) is performed to correct amplitude variation and phase variation added in the transmission path by a channel equalization section 513.

In FIG. 7 (B), a transmission symbol input from the multiplexing section is input to a subcarrier mapping section 515. For the transmission symbol mapped to an appropriate subcarrier (frequency domain) by the subcarrier mapping section 515, IFFT processing is performed in an IFFT section 516. After that, the transmission symbol is converted to serial data by a parallel/serial converter (P/S section 517) and then part of the IFFT output signal is added as a guard interval in a GI adding section 518.

In the present embodiment, the dedicated resources for the large cell base station, the dedicated resources for the small cell base station and the shared resources can be divided in the frequency domain (frequency division multiplexing) (e.g., allocated as a subcarrier group when OFDM is applied), but these resources are preferably divided in the time domain (time multiplexing). This is because interference may be generated between subcarriers in view of saturation of nonlinear elements in the receiver even when frequency-divided different bands (different subcarrier groups when OFDM is applied) are used.

According to the method shown in the present embodiment, when the number of small cell base stations belonging to the large cell base station is considerably large, a considerably large amount of resource addition request information may be transmitted to the large cell base station. Furthermore, according to the amount of traffic in the large cell base station, the small cell base station preferably changes criteria for determining whether or not to transmit resource addition request information.

Therefore, the small cell base station is preferably configured to transmit resource addition request information according to a predetermined rule. For example, the large cell base station sends a report regarding a traffic situation of the own cell at an X stage. Based on the report, each small cell base station determines a rule for determining whether or not to transmit resource addition request information according to a traffic situation at the large cell base station, a traffic situation at the own cell base station and a current resource allocation situation. Each small cell base station may be configured to determine whether or not to transmit a resource addition request based on a predetermined rule. The above-described rule may be determined by the large cell base station and broadcast to the small cell base station so that the small cell base station follows the broadcast rule.

Even when the number of small cell base stations belonging to the large cell base station is considerably large, it is possible to reduce resource addition request information transmitted from the small cell base stations to the large cell base station.

Embodiment 2

The present embodiment will describe a method of selecting a large cell base station to which a small cell base station belongs when the small cell base station receives signals from a plurality of large cell base stations. The present embodiment will also describe resource allocation when the small cell base station belongs to a plurality of large cell base stations.

When each small cell base station receives signals from a plurality of large cell base stations, if the small cell base station selects one large cell base station as a belonging cell to which the small base station belongs, a problem concerning interference may occur when allocating radio resources.

When, for example, the small cell base station 121b located near a cell edge of the large cell base station 111a receives signals from the two large cell base stations 111a and 111b (see FIG. 3), if only the large cell base station 111a is determined to be the belonging cell, the small cell base station 121b allocates resources using resources authorized by the large cell base station 111a.

Figure 10:
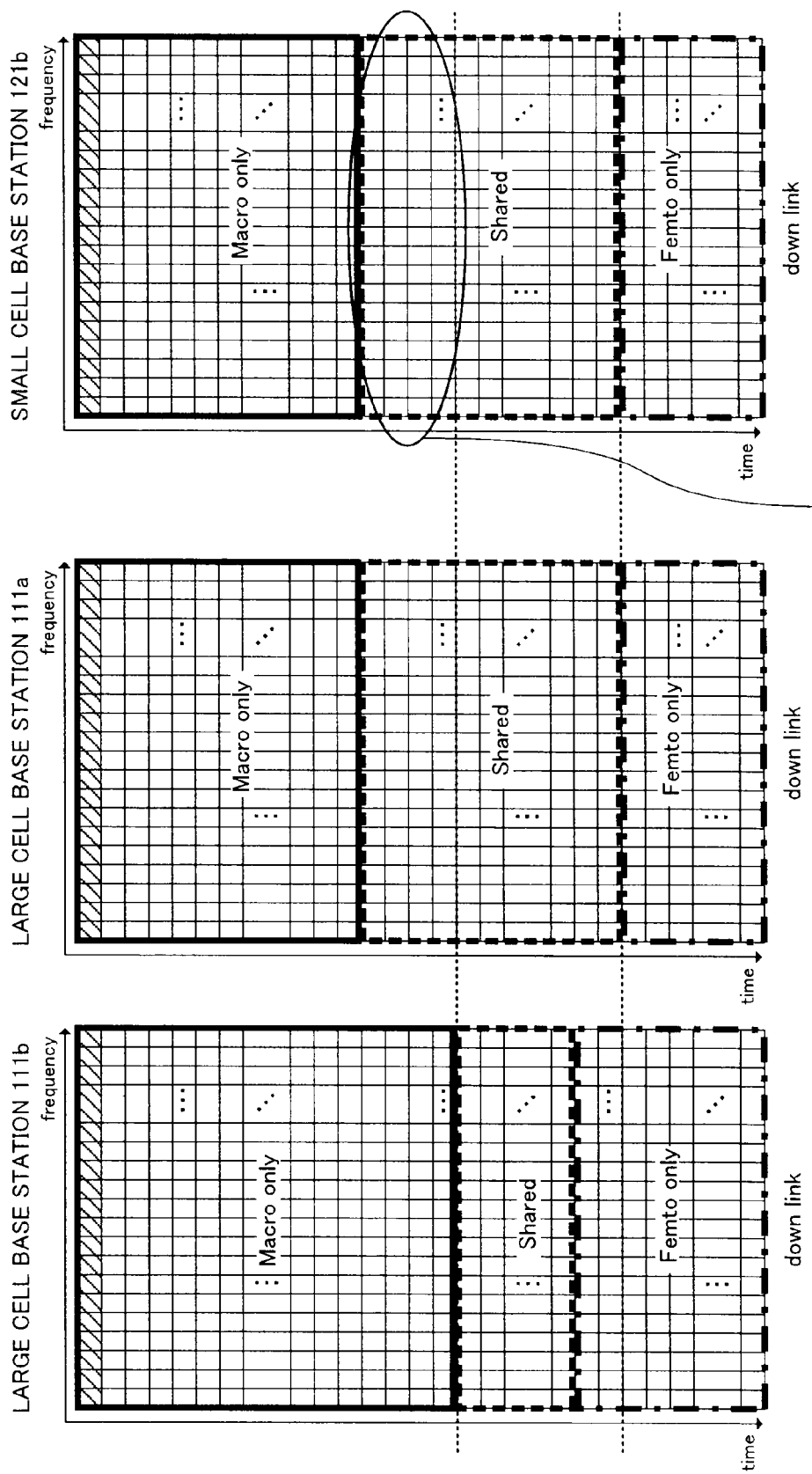
FIG. 10 is a diagram illustrating an example of allocation of dedicated resources for the large cell base station, dedicated resources for the small cell base station and shared resources in different large cell base stations.

On the other hand, when a region allocated by the other large cell base station 111b for dedicated resources for the large cell base station 111b overlaps with a region allocated by the small cell base station 121b for shared resources, the mobile terminal apparatus 112b which is located near the small cell base station 121b and receives a signal from the large cell base station 111b using the overlapping resources receives interference from the small cell base station 121b (see FIG. 10). In this case, the large cell base station 111b has no means for securing communication quality of the mobile terminal apparatus 112b that receives interference.

Therefore, the small cell base station 121b preferably receives resource allocation information from all large cell base stations from which the small cell base station 121b receives signals and controls resources used based on the received resource allocation information.

Figure 11:
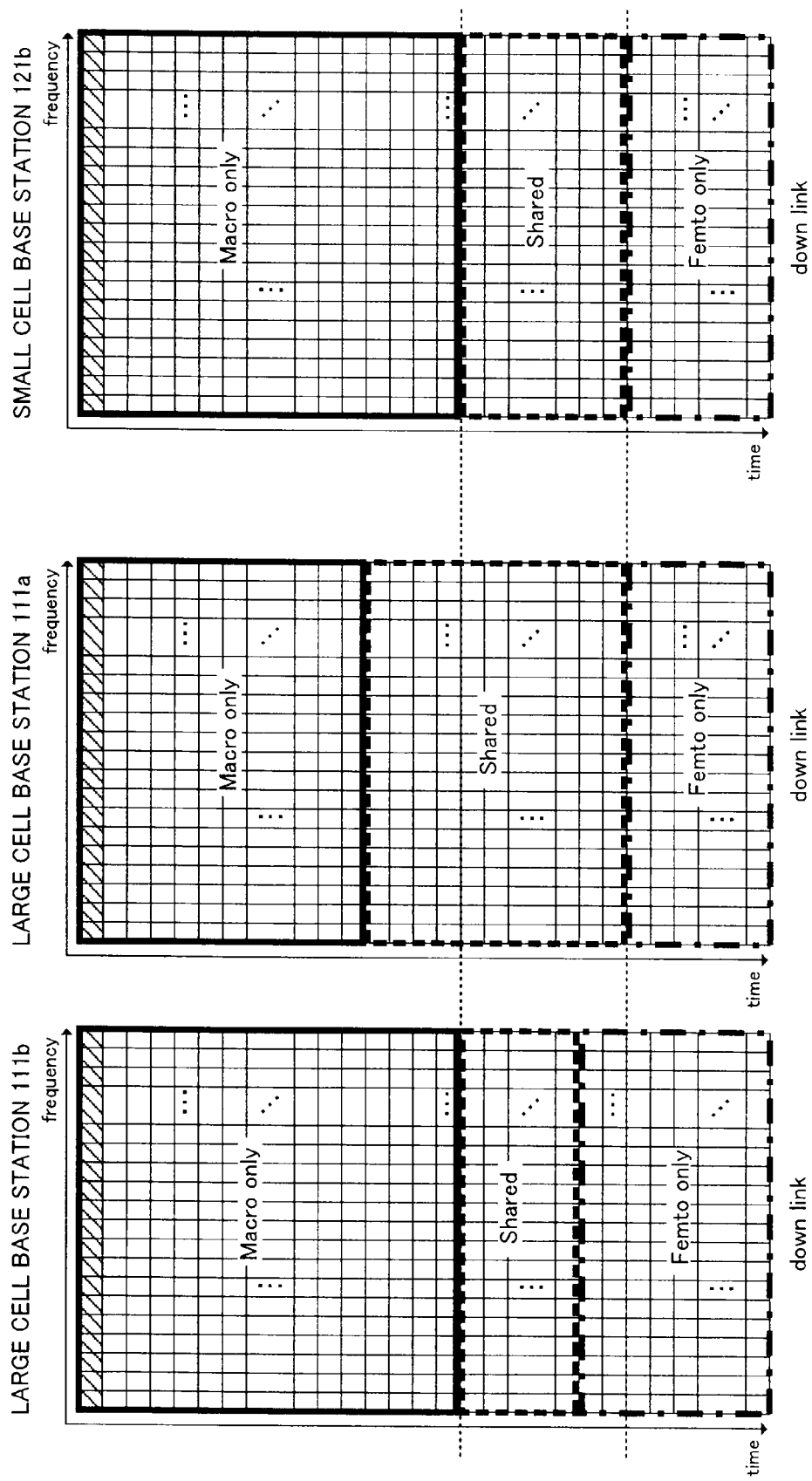
FIG. 11 is a diagram illustrating an example of allocation of dedicated resources for the large cell base station, dedicated resources for the small cell base station and shared resources in different large cell base stations and a small cell base station.

For example, regions allocated by all large cell base stations as the dedicated resources for the small cell base station are selectively used as the dedicated resources for the small cell base station. Furthermore, in addition to this, regions allocated by all large cell base stations as the shared resources may also be used by the small cell base station (see FIG. 11).

In this case, when sending a resource addition request, each small cell base station may be configured to send the resource addition request to all large cell base stations to which each small cell base station belongs. Furthermore, when information of the dedicated resources for the small cell base station is reported from a predetermined number or more of large cell base stations, each small cell base station may be configured to take into account only predetermined X pieces of information. In this case, each small cell base station can select X large cell base stations according to the strengths of the received signals from the large cell base stations.

Furthermore, a plurality of large cell base stations can respectively allocate dedicated resources for the large cell base station (Macro only), shared resources (Shared) and dedicated resources for the small cell base station (Femto only) at arbitrary regions when the respective resources are time-multiplexed.

Figure 9:
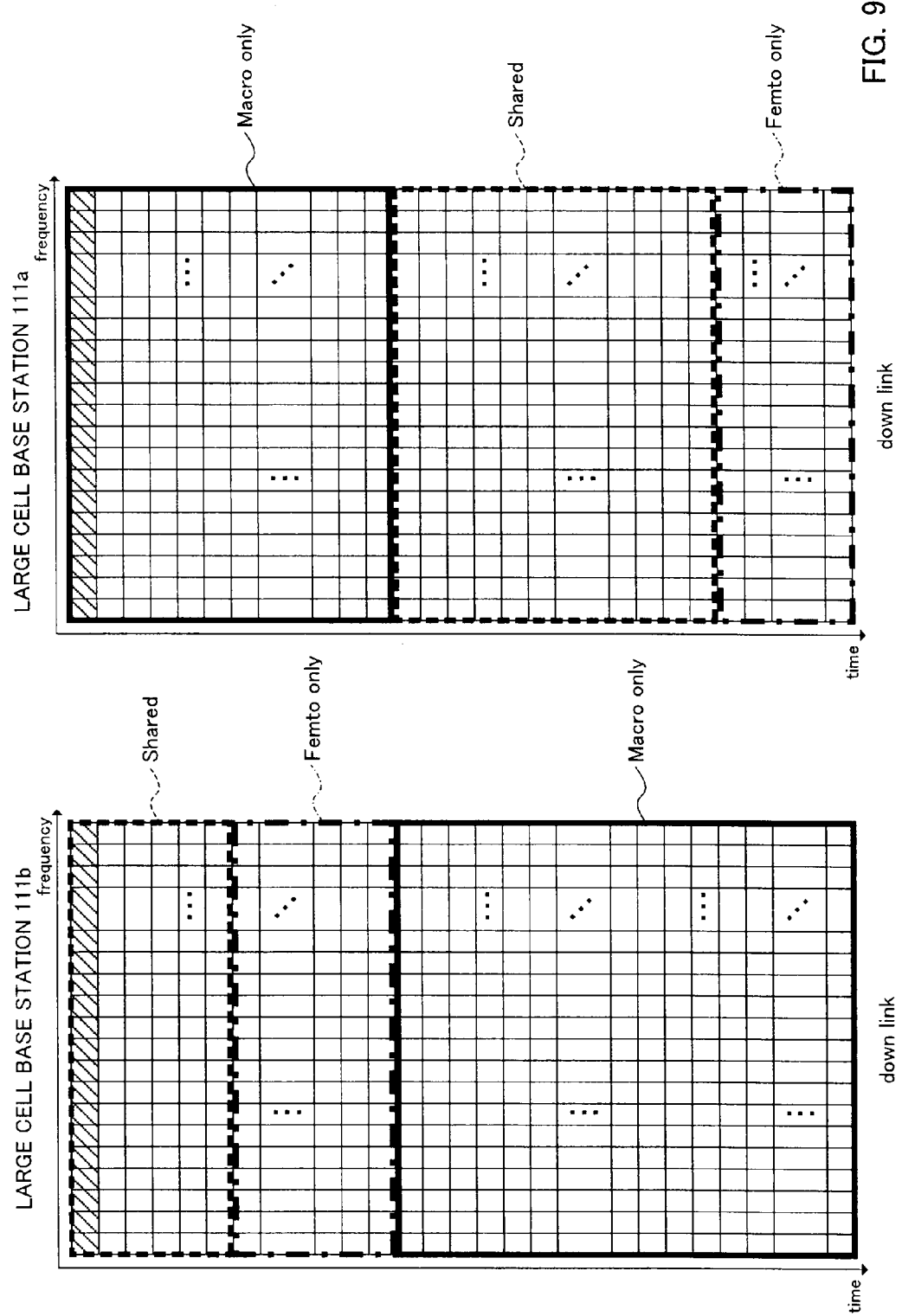
FIG. 9 is a diagram illustrating an example of allocation of dedicated resources for the large cell base station, dedicated resources for the small cell base station and shared resources in different large cell base stations.

For this reason, when the small cell base station uses, as allocated resources, only the regions allocated by all the large cell base stations as dedicated resources for the small cell base station (or shared resources), if each large cell base station determines dedicated resource and shared resources using an arbitrary method, the small cell base station may not be able to use any resources as shared resources (see FIG. 9).

Therefore, as shown in FIG. 10, it is preferable to set the order of allocating dedicated resources for the large cell base station, shared resources and dedicated resources for the small cell base station in advance. For example, in the time domain, resources can be allocated as follows using a predetermined symbol as a reference. First to last symbols can be set as a predetermined time region.

First symbol to X1-th symbol: dedicated resources for large cell base station (X1+1)-th symbol to X2-th symbol: shared resources (X2+1)-th symbol to last symbol: dedicated resources for small cell base station Thus, setting the order of allocating dedicated resources for the large cell base station, shared resources and dedicated resources for the small cell base station in advance makes it possible to ensure resources available for the small cell base station and also effectively suppress interference.

Furthermore, important control signals transmitted from the small cell base station are preferably transmitted using a channel allocated to dedicated resources for the small cell base station. On the other hand, when control information is transmitted in this way, the control signal includes resource allocation information. In this case, it is necessary to stock information is detected and to detect data signals in the predetermined frame after demodulating the control signal.

Figure 13:
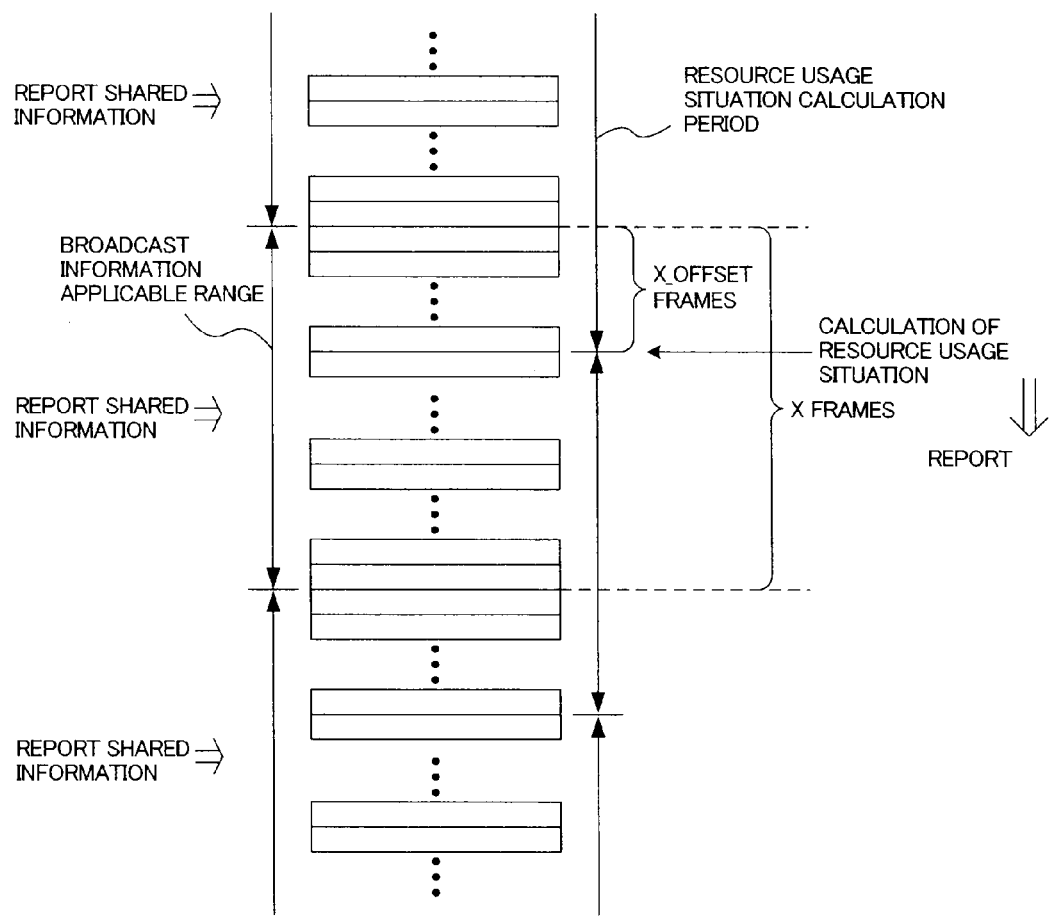
FIG. 13 is a diagram illustrating an example of transmission timing of control information according to the present embodiment.

Therefore, as shown in FIG. 13, control information from the small cell base station transmitted in X-th frame preferably includes allocation information on the frame transmitted in X+1-th frame. Furthermore, in this case, the timing of reporting a resource addition request may be predetermined X-th frames.

Furthermore, since a change of allocated resources for the dedicated/shared resources have an impact not only the small cell base station located in the own cell but also the small cell base station located in the neighboring cell as described above, the change is preferably reported in advance. Furthermore, it is preferable to set X frames (X>1) as the cycle of updating the allocated resources and use the update cycle for all large cell base stations.

Embodiment 3

The present embodiment will describe resource addition request information reported from the small cell base station to the large cell base station. As described above, resource addition request information is generated by the small cell base station using a resource usage situation and a traffic situation, and reported to the large cell base station. Reporting of the resource addition request information from the small cell base station to the large cell base station may be performed via a wired channel or wireless channel, but reporting via a wireless channel is preferable.

When the resource addition request information is reported via a wired channel, information from all small cell base stations belonging to the large cell base station is transmitted over a wired network, and therefore the load of the network may increase. On the other hand, transmitting the resource addition request information via a wireless channel may occupy some radio resources but since information of small cell base stations belonging to each large cell base station can be locally handled, which allows efficient control.

Furthermore, when resource addition request information is reported via a wireless channel, the small cell base station may be configured to integrate information, generates a signal and reports the signal to the large cell base station instead of reporting a traffic situation of resource usage situation separately.

For example, the small cell base station may be configured to include a request level of additional resource allocation and the amount of requested resources (e.g., request level: X level, amount of resources: Y level) in the resource addition request information and to report. Here, the request level refers to the degree (e.g., large/medium/small/none) of request of additional allocation of dedicated resources or shared resources. The amount of requested resources refers to the amount (e.g., 5/10/15/20 OFDM symbols) of additional allocation of dedicated resources or shared resources. Furthermore, the small cell base station may be configured to report only the amount of requested resources or the requested resource level. When there is no resource addition request from the small cell base station to the large cell base station, the small cell base station may be configured not to transmit resource addition request information is not transmitted.

Furthermore, when resource addition request information is reported via a wireless channel, it is possible to realize efficient reporting by allocating a signal pattern to each piece of information integrated by the small cell base station, providing and reporting common resources to all the small cell base stations.

As an example, considering only dedicated resources for the large cell base station and shared resources, a case will be assumed where the resource addition request information is reported to the large cell base station concentrating on signals indicating amount of requested resources is either large or small.

Suppose S1, S2, S3, and S4 corresponding to two types of signals indicating amount of requested resources is large/small, for example:

When the amount of requested resources is small: $1+1i, 1+1i, 1+1i, 1+1i$

When the amount of requested resources is large: $1+1i, -1-1i, 1+1i, -1-1i$

These signals are transmitted by each small cell base station using not individual resources for each small cell base station but commonly provided resources. The large cell base station may monitor whether or not a request signal is transmitted using this resource and control allocation of shared resources and dedicated resources for the large cell base station based on the detection result.

Furthermore, in order for the large cell base station to decide the number of requesting small cell base stations, the small cell base station may transmit resource addition request information with the transmission power set so that the receiving power at the large cell base station becomes a predetermined value and the large cell base station may estimate the number of requesting small cell base stations according to the receiving power of the signal and perform resource allocation based on this. In this case, the large cell base station detects signals using a plurality of antennas, and can thereby detect signals with high accuracy.

Furthermore, as a method for the large cell base station to more accurately decide the number of requesting small cell base stations, a plurality of signal sequences may be provided for when the amount of requested resources is small and when the amount of requested resources is large, and each small cell base station may randomly select and transmit a signal sequence.

Furthermore, the radio link used in this case may be a channel through which a large cell base station and a mobile terminal apparatus under the control of the large cell base station carry out communication or another dedicated wireless channel may be used. When a channel through which the large cell base station and mobile terminal apparatus under the control of the large cell base station carry out communication is used, radio resources dedicated to the large cell base station is preferably used.

Embodiment 4

The present embodiment will describe a communication method of a small cell base station provided outside a communication area of a large cell base station.

It is difficult for a small cell base station installed outside a communication area of a large cell base station to receive a signal transmitted from the large cell base station or synchronize with a network and perform the operation shown in the above-described embodiment.

For this reason, the small cell base station may be configured not to be allowed to carry out communication in view of more strictly limiting interference with the large cell base station and a mobile terminal apparatus under the control of the large cell base station.

On the other hand, the small cell base station provided outside the area of the large cell base station has sufficiently large propagation loss from the large cell base station or mobile terminal apparatus under the control of the large cell base station and may not provide interference to these terminals. In this case, the small cell base station may be allowed to carry out communication using all radio resources.

When the small cell base station is allowed to carry out communication, it is difficult to apply a communication method based on above-described resource request to the large cell base station and resource allocation of the large cell base station because synchronization is not established.

For this reason, the small cell base station may be configured to perform sensing regarding an uplink signal in a predetermined cycle and to be allowed to carry out communication over a predetermined period during which it is not possible to confirm a signal from the mobile terminal apparatus under the control of the large cell base station. Furthermore, the small cell base station may also be configured to set its transmission power to maximum power which is smaller by a predetermined level than a normally allowable maximum value.

Furthermore, GPS information and position information set in a manual may be reported to the mobile communication network side over a wired network or the like and the small cell base station may carry out communication only when allowed to do so.

The present invention is not limited to the above-described embodiments, but may be implemented modified in various ways. For example, its processing section or processing procedure can be implemented modified as required without departing from the scope of the present invention. Other parts may also be implemented modified in various ways as appropriate without departing from the scope of the present invention.

Embodiment 5

The present embodiment will detail a method whereby a small cell base station belongs to a large cell base station. The above-described embodiments have assumed that all large cell base stations have a function for sharing a frequency band with a small cell base station (hereinafter referred to as "frequency sharing function"). The present embodiment will describe a case where only some large cell base stations have the frequency sharing function.

Figure 14:
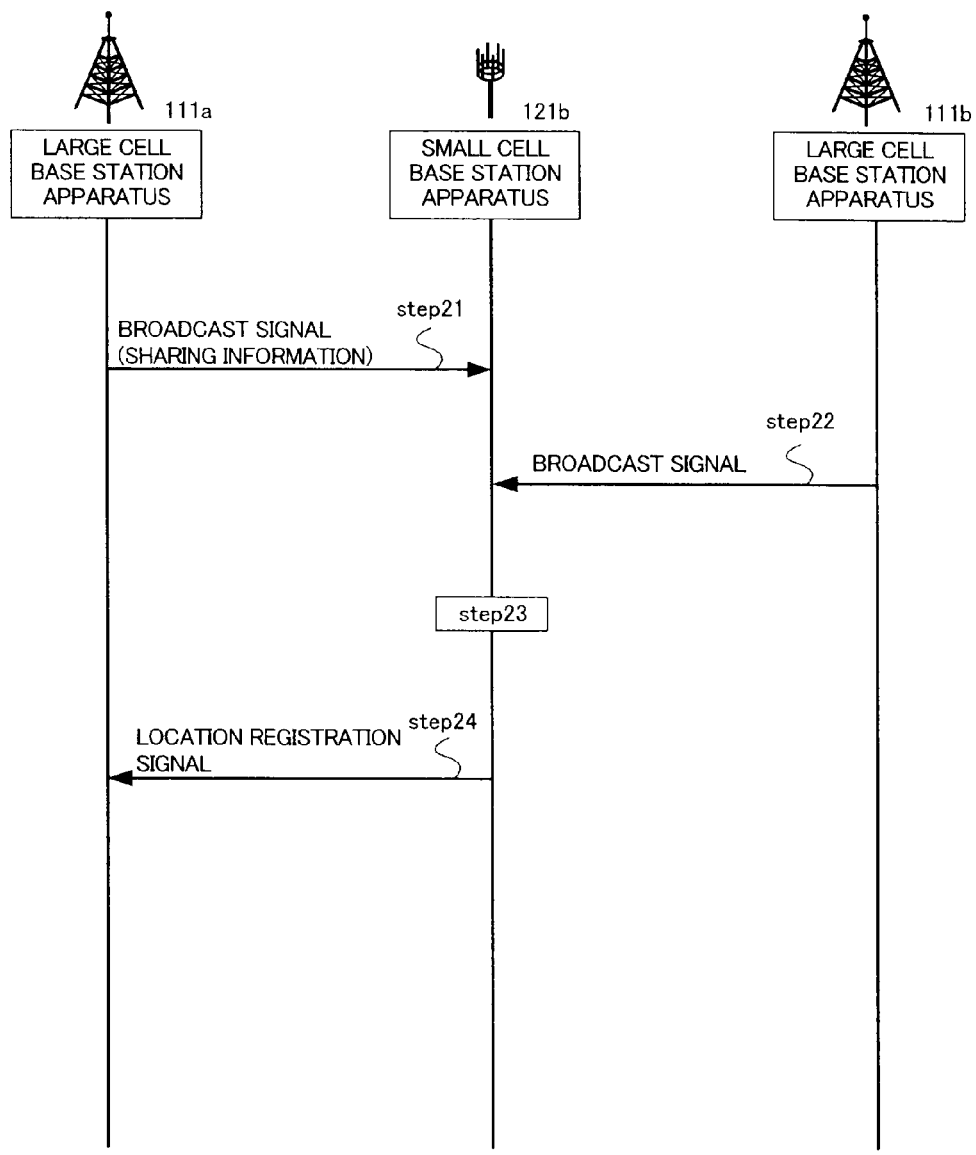
FIG. 14 is a diagram illustrating another example of the radio communication method according to the present embodiment.

With reference to FIG. 14, an example of a method will be described whereby a small cell base station comes to belong to a large cell base station when only some large cell base stations have the frequency sharing function. In FIG. 14, suppose the large cell base station 111a in FIG. 3 has a frequency sharing function but the large cell base station 111b has no frequency sharing function. Furthermore, in FIG. 14, suppose the small cell base station 121b is newly introduced near the cell edges of the large cell base stations 111a and 111b in FIG. 3.

The large cell base stations 111a and 111b each transmit a broadcast signal for the small cell base station 121b to detect the large cell base station 111a (step 21, step 22). Here, since the large cell base station 111a has the frequency sharing function, the broadcast signal from the large cell base station 111a includes information indicating that it has the frequency sharing function (hereinafter referred to as "sharing information"). On the other hand, since the large cell base station 111b has no frequency sharing function, the broadcast signal from the large cell base station 111b does not include the above-described sharing information. For example, a pilot signal is used as the broadcast signal.

The small cell base station 121b receives the broadcast signals from the large cell base stations 111a and 111b, and determines a belonging large cell base station based on the received broadcast signals (step 23). To be more specific, the small cell base station 121b determines whether or not it belongs to the large cell base station that transmitted the broadcast signal based on whether or not the received broadcast signal includes the above-described sharing information. Here, since the broadcast signal from the large cell base station 111a includes the sharing information, the small cell base station 121b determines that it belongs to the large cell base station 111a. On the other hand, since the broadcast signal from the large cell base station 111b does not include the sharing information, the small cell base station 121b determines that it does not belong to the large cell base station 111b.

The small cell base station 121b transmits a location registration signal to the large cell base station 111a determined in step 23 (step 24). Using such a location registration signal, the small cell base station 121b reports that it belongs to the large cell base station 111a. Here, the "location registration signal" refers to a signal for requesting registration processing for enabling communication under the control of the large cell base station.

The small cell base station 121b belonging to the large cell base station 111a shares a frequency band with the large cell base station 111a as described in Embodiments 1 to 4 (e.g., see step 12 to step 18 in FIG. 12).

As described above, in FIG. 14, the large cell base station 111a having the frequency sharing function transmits a broadcast signal including the above-described sharing information. For this reason, even when only some large cell base stations 111a have a frequency sharing function, the newly introduced small cell base station 121b can belong to the large cell base station 111a appropriately.

Figure 15:
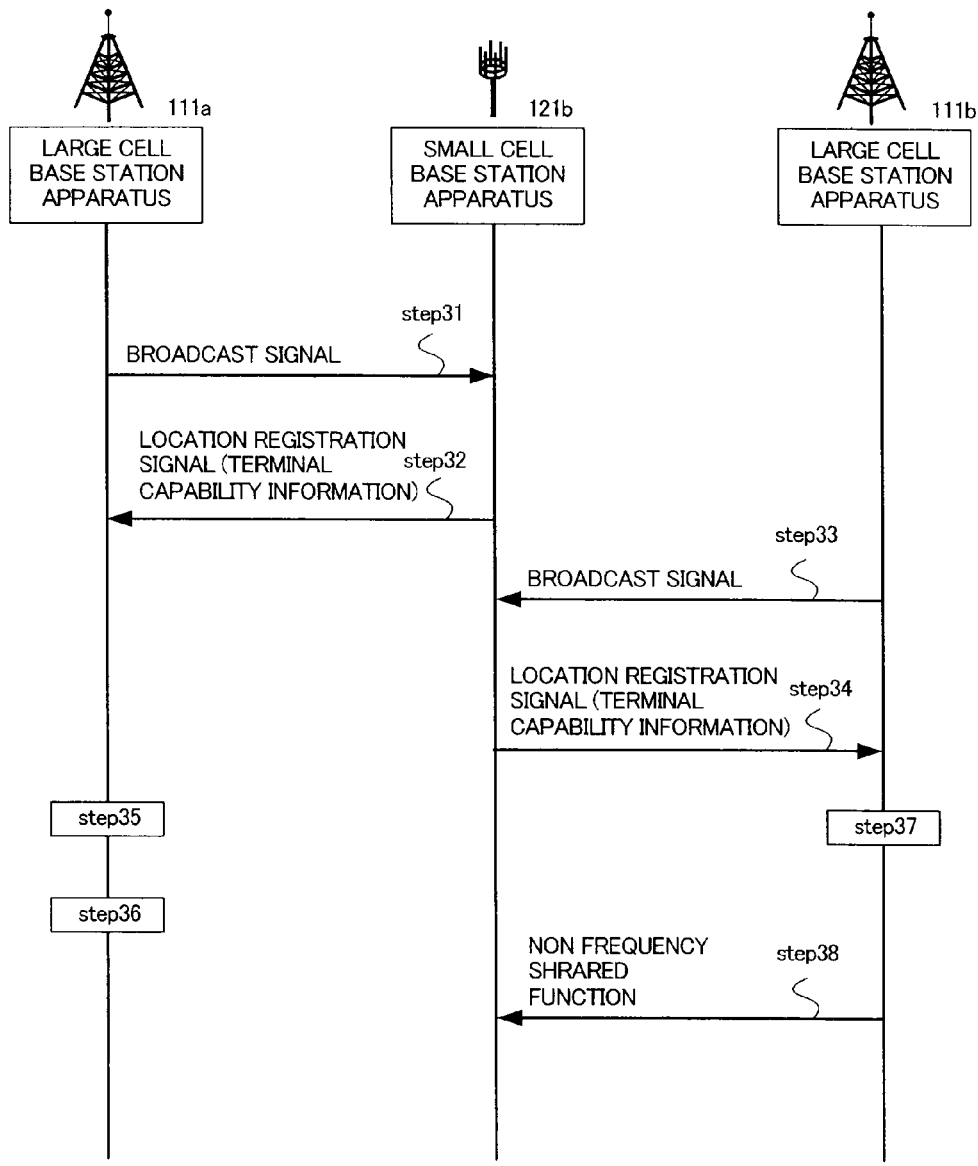
FIG. 15 is a diagram illustrating a further example of the radio communication method according to the present embodiment.

Next, with reference to FIG. 15, another example of a method will be described whereby the small cell base station comes to belong to a large cell base station when only some large cell base stations have a frequency sharing function. In FIG. 15, suppose the large cell base station 111a in FIG. 3 has the frequency sharing function, but the large cell base station 111b has no frequency sharing function. Furthermore, in FIG. 15, the small cell base station 121b is newly introduced near the cell edges of the large cell base stations 111a and 111b in FIG. 3.

The large cell base stations 111a and 111b each transmit a broadcast signal for the small cell base station 121b to detect the large cell base stations 111a and 111b (step 31, step 33). In FIG. 15, unlike FIG. 14, a broadcast signal from the large cell base station 111a does not include the above-described sharing information.

Upon receiving the broadcast signals from the large cell base stations 111a and 111b, the small cell base station 121b transmits location registration signals to the large cell base stations 111a and 111b (step 32, step 34). Here, the location registration signal shown in FIG. 15 includes terminal capability information of the small cell base station 121b. The terminal capability information is set so as to make it possible to identify that the small cell base station is one that shares frequency with the large cell base station. To be more specific, parameters of the terminal capability information may be set such that the terminal capability information of the small cell base station 121b can be distinguished from the terminal capability information of the mobile terminal apparatus 112a directly connected to the large cell base station 111a. As such a parameter, for example, an identifier for identifying a small cell base station that shares frequency with the large cell base station may be newly added to the terminal capability information as UE capability.

The large cell base stations 111a and 111b each determine whether the location registration signal is from the small cell base station 121b or from the mobile terminal apparatus directly connected to the own station based on the terminal capability information included in the received location registration signal (step 35, step 37).

The location registration signal is determined to be from the small cell base station 121b, the large cell base station 111a, which has the frequency sharing function, performs location registration for the small cell base station 121b (step 36). On the other hand, the large cell base station 111b, which has no frequency sharing function, reports that fact to the small cell base station 121b (step 38).

The small cell base station 121b which performs location registration to (belongs to) the large cell base station 111a shares the frequency band with the large cell base station 111a as described in Embodiments 1 to 4 (e.g., see step 12 to step 18 in FIG. 12).

As described above, in FIG. 15, the large cell base stations 111a and 111b determine whether the sender of the location registration signal is the small cell base station or the mobile terminal apparatus based on the terminal capability information included in the location registration signal. Furthermore, when the sender of the location registration signal is the small cell base station, the large cell base station 111a having the frequency sharing function performs location registration for the small cell base station 121b, but the large cell base station 111b having no frequency sharing function does not perform location registration for the small cell base station 121b. Therefore, even when only some large cell base stations 111a have the frequency sharing function, the newly introduced small cell base station 121b can appropriately come to belong to the large cell base station 111a.

As described in Embodiment 5 (FIGS. 14 and 15), when the small cell base station 121b receives a broadcast signal from the large cell base station 111a having the frequency sharing function and a broadcast signal from the large cell base station 111b having no frequency sharing function, the small cell base station 121b may prohibit communication using the frequency sharing function with the large cell base station 111a having the frequency sharing function. This is intended to prevent the small cell base station 121b sharing the frequency band with the large cell base station 111a from impairing communication with the mobile terminal apparatus located in the cell of the other large cell base station 111b.

For example, when the reception level of a broadcast signal from the large cell base station 111a having the frequency sharing function is smaller than the reception level of a broadcast signal from the large cell base station 111b having no frequency sharing function, or smaller than a value obtained by adding a predetermined level (0 or a positive value) to the reception level of a broadcast signal from the large cell base station 111b having no frequency sharing function, the small cell base station 121b may prohibit communication with the large cell base station 111a using the frequency sharing function. Alternatively, when the reception level of a broadcast signal from the large cell base station 111b having no frequency sharing function is higher than a predetermined threshold, the small cell base station 121b may prohibit communication with the large cell base station 111a using the frequency sharing function.

The small cell base station 121b may stop transmission of a location registration signal to the large cell base station 111a (e.g., step 24 in FIG. 14 and step 32 in FIG. 15) to prohibit communication with the large cell base station 111a using the frequency sharing function. Furthermore, after belonging to the large cell base station 111a through a location registration signal, the small cell base station 121b may also perform the processing of cancel the belonging to the large cell base station 111a. Furthermore, the prohibition of this transmission may be determined in the small cell base station 121b.

Embodiment 6

The present embodiment will detail a method of allocating resources to a mobile terminal apparatus under the control of a large cell base station. The above-described embodiment has described the method of resource allocation when all mobile terminal apparatuses under the control of a large cell base station have a frequency sharing function. The present embodiment will describe a method of resource allocation when only some mobile terminal apparatuses under the control of a large cell base station have a frequency sharing function.

Figure 16:
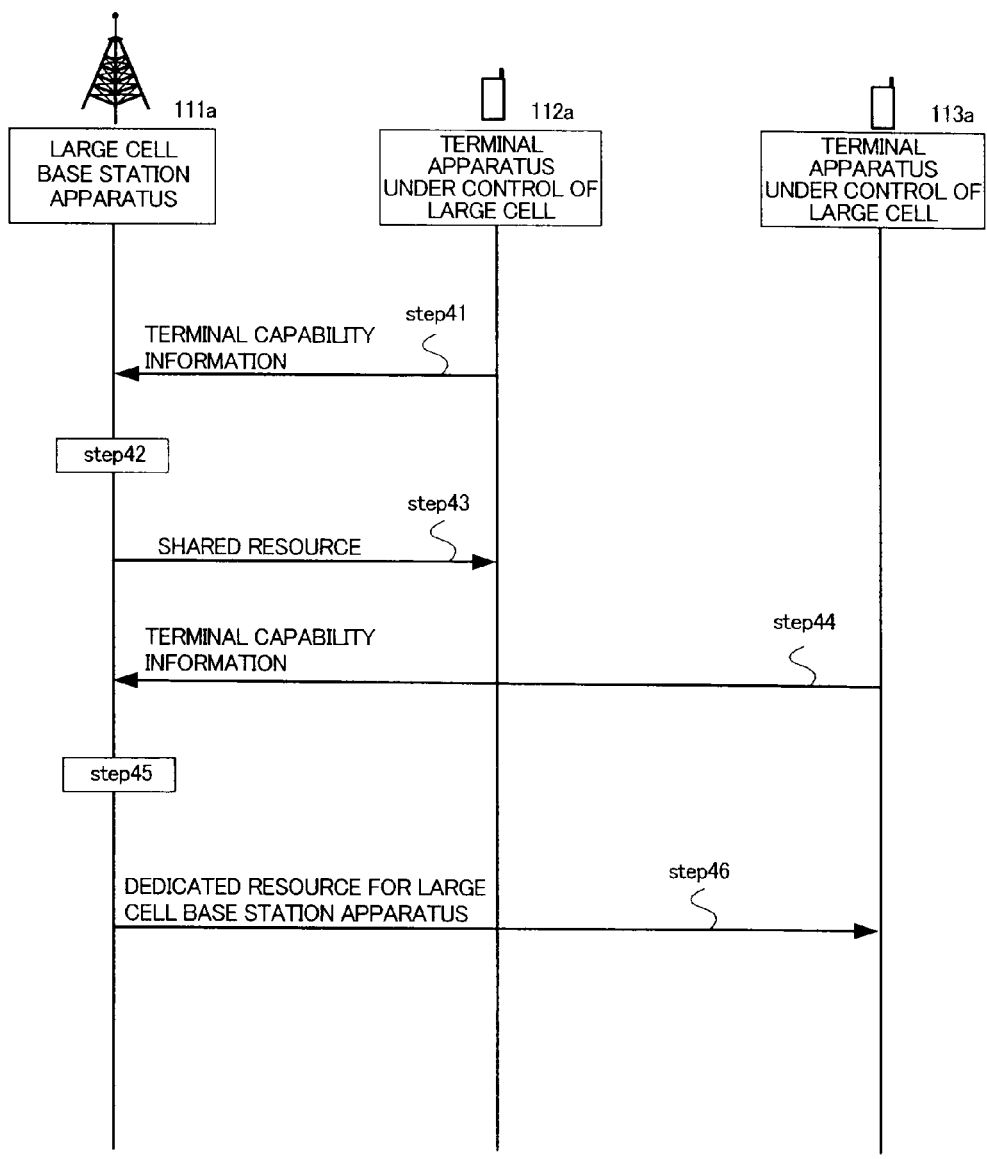
FIG. 16 is a diagram illustrating a still further example of the radio communication method according to the present embodiment.

A resource allocation method when only some mobile terminal apparatuses under the control of a large cell base station have a frequency sharing function will be described with reference to FIG. 16. In FIG. 16, suppose the large cell base station 111a in FIG. 3 has a frequency sharing function. Furthermore, suppose the mobile terminal apparatus 112a under the control of the large cell base station 111a has a frequency sharing function but a mobile terminal apparatus 113a (not shown in FIG. 3) which is also under the control of the large cell base station 111b has no frequency sharing function.

Furthermore, the terminal capability information of the mobile terminal apparatus 112a is set so as to make it possible to identify that the terminal has a frequency sharing function. To be more specific, a parameter may be set in the terminal capability information of the mobile terminal apparatus 112a such that the mobile terminal apparatus 112a is distinguishable from the mobile terminal apparatus 113a having no frequency sharing function. As such a parameter, for example, an identifier that identifies that the terminal is a mobile terminal apparatus having a frequency sharing function may be newly added to the terminal capability information as UE Capability.

The mobile terminal apparatuses 112a and 113a each report terminal capability information of the own apparatus to the large cell base station 111a that performs location registration (step 41, step 44). As described above, since the mobile terminal apparatus 112a has the frequency sharing function, the terminal capability information from the mobile terminal apparatus 112a is set so as to make it possible to identify that the terminal has the frequency sharing function. Furthermore, since the mobile terminal apparatus 113a has no frequency sharing function, the terminal capability information from the mobile terminal apparatus 113a is set so as to make it possible to identify that the terminal has no frequency sharing function.

The large cell base station 111a determines which of dedicated resources for the large cell base station or shared resources for both the large cell and small cell base stations should be assigned based on the terminal capability information from the mobile terminal apparatuses 112a and 113a (step 42, step 45). To be more specific, the large cell base station 111a assigns shared resources to the mobile terminal apparatus 112a having the frequency sharing function and assigns dedicated resources for the large cell base station to the mobile terminal apparatus 113a having no frequency sharing function.

The large cell base station 111a reports the assigned resources to the mobile terminal apparatuses 112a and 113a (step 43, step 46). To be more specific, the large cell base station 111a reports shared resources to the mobile terminal apparatus 112a and reports dedicated resources for the large cell base station to the mobile terminal apparatus 113a.

As described above, in FIG. 16, the large cell base station 111a determines whether or not the mobile terminal apparatuses 112a and 113a under the control thereof have the frequency sharing function based on the terminal capability information reported from the mobile terminal apparatuses 112a and 113a. Furthermore, the large cell base station 111a assigns shared resources to the mobile terminal apparatus 112a having the frequency sharing function and assigns dedicated resources for the large cell base station to the mobile terminal apparatus 113a having no frequency sharing function. Therefore, even when only some mobile terminal apparatuses 112a under the control of the large cell base station 111a have the frequency sharing function, the large cell base station 111a can assigns resources appropriately. Furthermore, the large cell base station 111a can share frequency with the mobile terminal apparatus 112a without providing harmful interference to the mobile terminal apparatus 113a having no frequency sharing function.

What is claimed is:

1. A radio communication method for sharing a frequency band between a large cell system including a large cell base station having a relatively large cell size and a small cell system including a small cell base station having a relatively small cell size, comprising:
   allocating, by the large cell base station, a dedicated resource for the large cell base station and a shared resource for both the large cell base station and the small cell base station dynamically based on information reported from a mobile terminal apparatus carrying out communication in a cell of the large cell base station and information reported from the small cell base station belonging to the large cell base station;
   broadcasting, from the large cell base station, information on the dedicated resource for the large cell base station and the shared resource to the small cell base station belonging to the large cell base station; and
   determining, by the small cell base station belong to at least one large cell base station, an assignment resource in a cell of the small cell base station based on the information broadcast from the large cell base station to which the small cell base station belongs on the dedicated resource for the large cell base station and the shared resource.

2. The radio communication method according to claim 1, wherein the information reported from the mobile terminal apparatus carrying out communication in the cell of the large cell base station is information on channel quality, and the information reported from the small cell base station belonging to the large cell base station is resource addition request information.

3. The radio communication method according to claim 1, wherein,
   the large cell base station dynamically allocates a dedicated resource for the small cell base station in addition to the dedicated resource for the large cell base station and the shared resource; and
   the large cell base station broadcasts information on the dedicated resource for the small cell base station to the small cell base station.

4. The radio communication method according to claim 1, wherein when receiving signals from a plurality of large cell base stations, the small cell base station belongs to a large cell base station having the highest receiving power.

5. The radio communication method according to claim 3, wherein when the small cell base station belongs to a plurality of large cell base stations from which the small cell base station receives signals, the small cell base station individually reports resource addition request information to the plurality of large cell base stations, and allocates a resource to a mobile terminal apparatus carrying out communication under the control of the small cell base station by using a region allocated for the dedicated resource for the small cell base station and a region allocated for the shared resource by all the plurality of large cell base stations based on resource allocation information broadcast from the plurality of large cell base stations respectively.

6. The radio communication method according to claim 5, wherein the number of large cell base stations to which the small cell base station belongs is limited to a predetermined number or below.

7. The radio communication method according to claim 5, wherein the dedicated resource for the large cell base station, the dedicated resource for the small cell base station and the shared resource are divided and allocated in a time domain.

8. The radio communication method according to claim 7, wherein each of the plurality of large cell base stations selectively allocates the dedicated resource for to the large cell base station, the dedicated resource for to the small cell base station and the shared resource in a predetermined time domain.

9. The radio communication method according to claim 1, wherein the small cell base station transmits a location registration signal to a large cell base station detected based on a broadcast signal from the large cell base station, and
   the large cell base station allows the small cell base station to belong to the large cell base station according to the location registration signal from the small cell base station.

10. The radio communication method according to claim 9, wherein when the broadcast signal from the large cell base station includes information indicating that the large cell base station has a function of sharing a frequency band with the small cell base station, the small cell base station transmits the location registration signal to the large cell base station.

11. The radio communication method according to claim 9, wherein when the location registration signal is determined to have been transmitted from a small cell base station based on terminal capability information included in the location registration signal and when the large cell base station has a function of sharing a frequency band with the small cell base station, the large cell base station allows the small cell base station to belong to the large cell base station.

12. The radio communication method according to claim 9, wherein when a received signal level received from the large cell base station having no frequency sharing function in the frequency band is higher than a predetermined threshold, the small cell base station stops transmitting the location registration signal to the large cell base station that shares the frequency band.

13. The radio communication method according to claim 9, wherein when a received signal level from the large cell base station that shares the frequency band is smaller than a level obtained by adding a predetermined level (0 or a predetermined value) to the received signal level from the large cell base station using the frequency band and having no frequency sharing function, the small cell base station stops transmitting the location registration signal to the large cell base station that shares the frequency band.

14. The radio communication method according to claim 1, wherein the large cell base station assigns a resource to a mobile terminal apparatus carrying out communication under the control of the large cell base station based on terminal capability information reported from the mobile terminal apparatus.

15. The radio communication method according to claim 14, wherein when the mobile terminal apparatus is determined to have a function of sharing a frequency band based on the terminal capability information, the large cell base station preferentially assigns the shared resource to the mobile terminal apparatus.

16. The radio communication method according to claim 14, wherein when the mobile terminal apparatus is decided to have no function of sharing a frequency band based on the terminal capability information, the large cell base station assigns the dedicated resource for the large cell base station to the mobile terminal apparatus.

17. A radio base station that holds a small cell base station having a cell size relatively smaller than an own cell under the control thereof and dynamically controls a dedicated resource for the own cell and a shared resource with the small cell base station, comprising:
   a resource channel information acquiring section configured to detect resource channel information from a mobile terminal apparatus carrying out communication under the control of the own cell;
   a resource usage situation monitoring section configured to detect a resource usage situation of the own cell;
   a resource addition request information signal detection section configured to detect resource addition request information reported from the small cell base station;
   a dedicated/shared resource determining section configured to dynamically allocate a dedicated resource for the own cell and a shared resource for both the own cell and the small cell base station based on the resource channel information, resource addition request information and the resource usage situation; and
   a transmitting section configured to broadcast resource allocation information determined by the dedicated/shared resource determining section to the small cell base station.

18. A radio base station belonging to a large cell base station having a cell size relatively larger than the own cell, comprising:
   a belonging base station determining section configured to determine the large cell base station to which the own cell belongs;
   a resource channel information acquiring section configured to detect resource channel information from a mobile terminal apparatus carrying out communication under the control of the own cell;
   a resource addition request signal generation section configured to generate resource addition request information to be reported to the large cell base station based on a resource usage situation of the own cell and a traffic situation;
   a dedicated/shared resource information detection section configured to detect information reported from the large cell base station on a dedicated resource for the large cell base station and a shared resource for both the own cell and the large cell base station; and
   a resource allocation control section configured to determine a resource to be assigned to each mobile terminal apparatus carrying out communication under the control of the own cell based on the information detected by the dedicated/shared resource information detection section.

* * * * *